United States Patent
Ouchi

(10) Patent No.: US 7,606,441 B2
(45) Date of Patent: Oct. 20, 2009

(54) IMAGE PROCESSING DEVICE AND A METHOD FOR THE SAME

(75) Inventor: Makoto Ouchi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 492 days.

(21) Appl. No.: 11/000,360

(22) Filed: Nov. 29, 2004

(65) Prior Publication Data

US 2006/0018547 A1    Jan. 26, 2006

(30) Foreign Application Priority Data

Nov. 27, 2003  (JP)  ............................ 2003-397150
Jan. 29, 2004  (JP)  ............................ 2004-021110

(51) Int. Cl.
*G06K 9/32* (2006.01)

(52) U.S. Cl. ...................................... 382/294; 382/298

(58) Field of Classification Search ................. 382/294
See application file for complete search history.

(56) References Cited

U.S. PATENT DOCUMENTS

| | | | | |
|---|---|---|---|---|
| 5,880,778 A * | 3/1999 | Akagi | ...................... | 348/218.1 |
| 5,982,951 A * | 11/1999 | Katayama et al. | ............ | 382/284 |
| 5,990,978 A * | 11/1999 | Kim et al. | .................... | 348/663 |
| 6,128,416 A * | 10/2000 | Oura | .......................... | 382/284 |
| 6,370,279 B1 * | 4/2002 | Paik | ............................ | 382/268 |
| 6,456,730 B1 * | 9/2002 | Taniguchi | ................... | 382/107 |
| 6,466,262 B1 * | 10/2002 | Miyatake et al. | ............ | 382/284 |
| 6,720,997 B1 * | 4/2004 | Horie et al. | .............. | 348/218.1 |
| 6,804,419 B1 * | 10/2004 | Miyake | ....................... | 382/300 |
| 7,085,435 B2 * | 8/2006 | Takiguchi et al. | ........... | 382/294 |

(Continued)

FOREIGN PATENT DOCUMENTS

JP         2555041        8/1996

(Continued)

OTHER PUBLICATIONS

Color matching for Video Mosaic applications, Ming siui lee, IEEE, 0-7803-8603-5, 2004, pp. 121-124.*

(Continued)

*Primary Examiner*—Brian P Werner
*Assistant Examiner*—Jayesh A Patel
(74) *Attorney, Agent, or Firm*—Martine Penilla & Gencarella, LLP

(57) ABSTRACT

An image processing device identifies the plurality of subject images which are overlapped partially, by recognizing a relative positional relationship of the plurality of subject images. The device separates into one or more blocks to segment the same area for each of the overlapped subject images the overlapping part of the images for the identified plurality of subject images. The device determines movement of an object that exists in the block for each of the blocks and generates a still image using one subject image of the overlapped plurality of subject images for blocks for which it is determined that the object has moved a specified amount or more, and using the overlapped plurality of subject images for the other blocks. As a result, the device generates a rectangular still image without blurring or doubling, because the still image is generated using one subject image of the plurality of subject images for the blocks for which it is determined that the object has moved.

8 Claims, 21 Drawing Sheets

U.S. PATENT DOCUMENTS

2002/0191846 A1* 12/2002 Crinon et al. ............... 382/173
2004/0052415 A1* 3/2004 Kondo et al. ............... 382/173

FOREIGN PATENT DOCUMENTS

JP  2003-009144  1/2003
JP  2003-198902  7/2003

OTHER PUBLICATIONS

Abstract of Japanese Patent Publication No. 63-142991 Pub. Date: Jun. 15, 1988, Patent Abstracts of Japan.
Abstract of Japanese Patent Publication No. 2003-009144 Pub. Date: Jan. 10, 2003, Patent Abstracts of Japan.
Abstract of Japanese Patent Publication No. 2003-198902 Pub. Date: Jul. 11, 2003, Patent Abstracts of Japan.

* cited by examiner

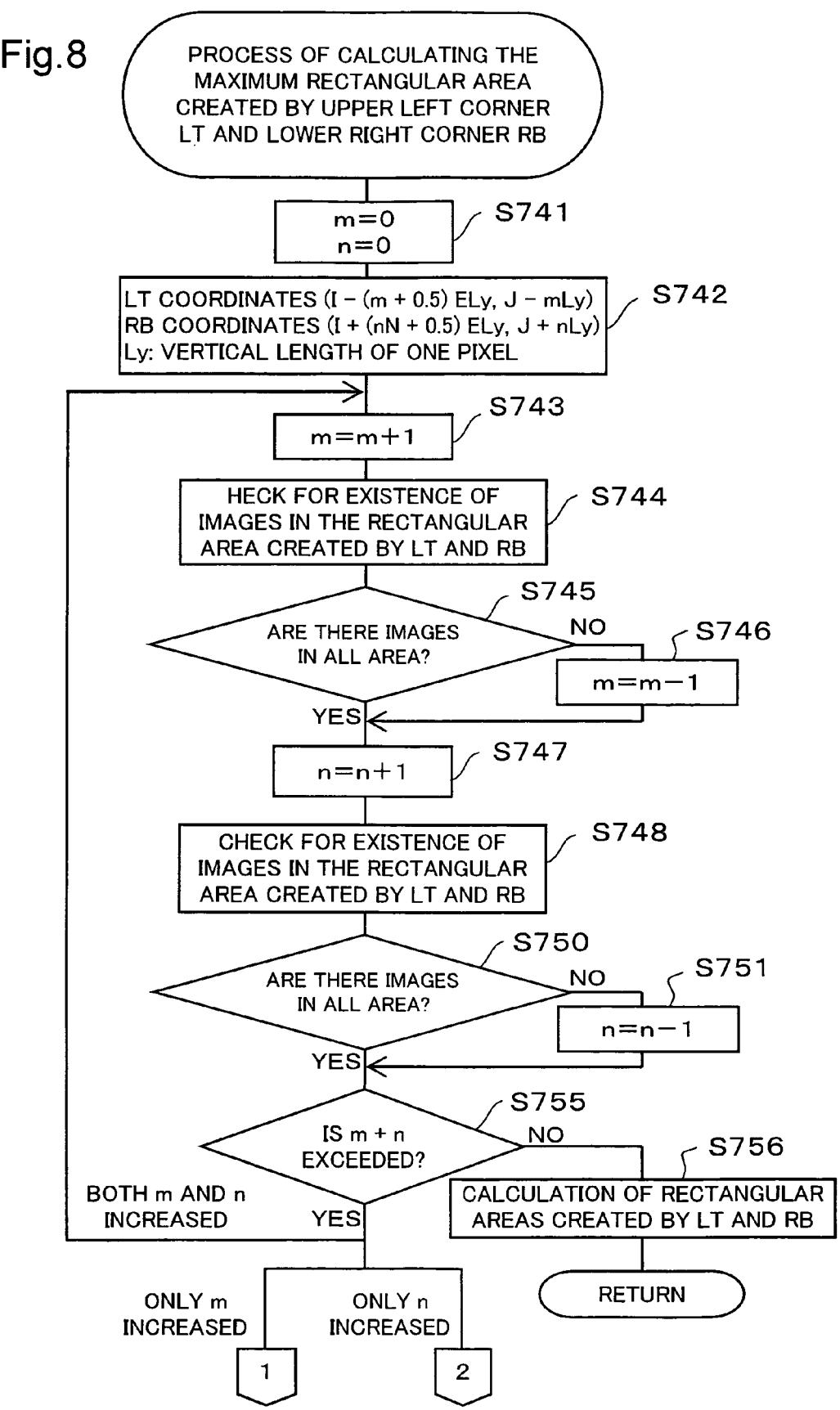

IMAGE PROCESSING DEVICE AND A METHOD FOR THE SAME

CLAIM OF PRIORITY

The present application claims priority from Japanese application P2003-397150 filed on Nov. 27, 2003 and P2004-21110 filed on Jan. 29, 2004, the content of which is hereby incorporate by reference into this application.

BACKGROUND OF THE INVENTION

1. Field of the Invention

The present invention relates to an image processing technology for generating a still image larger than one subject image by stitching a plurality of subject images acquired from a moving image or the like.

2. Description of the Related Art

Technology for overlapping captured images and generating a panoramic image is known from the past (e.g., see Japanese Patent No. 2555041-B, and Unexamined Patent No. JP-A-2003-9144).

In these publications are disclosed methods and devices for extracting the overlap between image data from a plurality of captured images and generating panoramic images.

Recently, not only is there overlapping of a plurality of captured images by a digital still camera or the like, but there is also taking of a specified number of frame images from a moving image consecutively captured by a digital video camera or the like, and stitching these (e.g. see Unexamined Patent No. JP-A-2003-198902).

With this kind of panoramic image generating device, a moving image captured using a digital video camera is recorded once in a recording medium, and when this moving image is played back, the still image fetching timing information and the calculated horizontal direction and vertical direction movement volume are read. After that, the still images at positions according to the movement volume of the plurality of fetched still images are overlapped to generate a panoramic image.

However, with this kind of image generating technology, the work of generating a rectangular panoramic image by overlapping a plurality of frame images had to be done manually, so there was the problem that complex work was required. Even if it is possible to automate the work of extracting information of the overlapping (movement volume) of mutual images fetched at a specified timing and of stitching the images to each other (following, this is called stitching), when cutting a rectangular panoramic image from the overlapped plurality of images, it was necessary for the user to move the cursor to specify an area and to do the work of cutting and dropping the unnecessary images.

Also, when the images to be used for stitching are decided and image synthesis is performed, when a object that moved during image capture such as an automobile or the like is captured for the part for which the captured images used for generating the panoramic image are stitched (hereafter called the stitch part), a plurality of still images overlap at the stitch part, so there is a large displacement at part of the images, and there is the problem that part of the image after synthesis may be blurry or be doubled up.

SUMMARY

The aspect of the present invention solves at least part of this kind of problem, and its purpose is to easily generate rectangular still image such as a panoramic image. Specifically, the purpose is to provide an image processing technology for which the size of the panoramic image is easily decided, and when synthesizing an image, even if there is a moving object in the part that is overlapped, there is no blurring or doubling of that subject image.

A first aspect of the image processing device of the present invention that achieves the purpose noted above has a structure as follows.

The image processing device for stitching a plurality of subject images and for generating a rectangular still image from the stitched images, the device comprising:

an image acquisition unit that acquires the plurality of subject images;

a positional relationship data generating unit that generates positional relationship data representing the relative positional relationship by which the acquired plurality of subject images are stitched;

an image area recognition unit that arranges the plurality of subject images according to the positional relationship data, and that recognizes an image existence area defined by a logical sum of the arranged plurality of subject images;

a rectangular image area determination unit that determines a rectangular image area to be generated from the recognized image existence area; and a still image extraction unit that extracts the rectangular still image using the plurality of subject images that exist in the determined rectangular image area.

A first aspect of the image processing method corresponding to this image processing device has the key points of being a still image generating method for stitching the plurality of subject images and for generating a rectangular still image using the stitched images. The method comprises:

acquiring a plurality of subject images;

generating a positional relationship data representing a relative positional relationship for stitching the acquired plurality of subject images;

arranging the plurality of subject images according to the positional relationship data;

recognizing an image existence area defined by a logical sum of the arranged plurality of subject images;

determining a rectangular image area to be generated from the recognized image existence area; and extracting the rectangular still image using the plurality of subject images that exist in the determined rectangular image area.

With this image processing technology, the image area created by the plurality of subject images are checked, and from that image area, a rectangular still image area that can be generated without missing images is determined. After that, a rectangular still image of this size is extracted using the plurality of subject images existing in the determined rectangular image area.

Here, for recognition of the image area, it is possible to perform this by the pixels that identify the image existence area, and also possible to calculate the rectangular image using the identified pixels. By doing this, it is possible to easily recognize the image area in which the subject image exists by checking for the presence or absence of identification allocated to the pixels. For the image acquisition, it is possible to acquire as the subject images the plurality of frame images that exist before or after at least the standard subject images including the standard subject image specified as the acquisition standard for the moving image from the moving image comprising a plurality of frame images.

It is also possible to constitute this by acquiring a standard subject image specified as the acquisition standard from a moving image including a plurality of the frame images, and at least one of the frame images existing before or after the standard subject image. In this case, by specifying the standard subject image that is the standard for the moving image, it is possible to extract rectangular still images defined as the logical sum from the plurality of images including that subject image. In this case, the plurality of subject images include the standard subject image, and it is possible to use the frame images acquired at specified intervals from the moving image.

When acquiring the plurality of subject images, it is also possible to acquire as the subject images the images for which a specified ratio of images peripheral to the original image to be acquired are cut off. By cutting off the peripheral images by a specified ratio, it is possible to generate still images using image parts with little distortion.

Alternatively, another possible constitution is, of the plurality of subject images, to receive a nomination of at least one subject image, and to set the maximum area of the rectangular image area including subject images nominated from the recognized image existence area. This is because several rectangular area can be generated by combining the subject images.

Furthermore, it is also possible to calculate the maximum rectangular still area that is the image of the aspect ratio specified from outside as the rectangular still image to be generated. By doing this, it is possible to automatically check the largest rectangular still images having the specified aspect ratio including part of the specified subject images.

When extracting the rectangular still images from the plurality of subject images, it is possible to determine the relative positional relationship of the plurality of subject images, to identify the overlapped plurality of subject images, to separate into one or more blocks for segmenting the same area for each of the overlapped subject images the overlapped part of the images for the identified plurality of subject images, and for each of these blocks, a determination is made of the movement of the object that exists in that block, and for blocks for which it was determined that the object had moved by the specified amount or more, one of the subject images among the plurality of overlapped subject images is used, and for blocks other than those, the plurality of overlapped subject images are used to generate the still image.

With this aspect of the image processing device, the overlapped part of the stitched subject images are separated into blocks, and a determination is made of object movement for each block. Then, for the blocks for which it is determined that the object has moved, because still image is generated using one subject image of the plurality of subject images, there is no blurring or doubling.

It is also possible to have an item for which this block separation is realized by comprising a first separation unit for which the plurality of overlapped subject images are vertically and horizontally separated, and a plurality of blocks having a size of M pixels×N pixels (M and N are integers of 2 or greater) are acquired, and a second separation unit for which by separating the subject images other than the one subject image to match the position of the block of the one subject image, blocks that segment the same area are acquired, and for the surplus blocks of a size that is less than the M pixel×N pixel size that can be generated for the subject image separated by the second separation unit, by the still image generating unit comprising a unit for eliminating surplus blocks not used for the still image generation. By doing this, it is possible to determine movement of the object for blocks having the same area to each other for the plurality of overlapped subject images.

Here, it is also possible to determine the movement of objects existing within the block using the pixel values that specified pixels within the block have. By doing this, it is possible to calculate the movement of the objects of the blocks as the movement volume of the blocks with pixels as the unit number.

Note that the constitution of using one subject image for blocks for which the object moved may be implemented alone for this image superimposition. Specifically, with this as an image processing method, this is an image processing method that stitches a plurality of subject images and generates a still image greater than one of the subject images, and with this, the relative positional relationship of the plurality of subject images is determined, the plurality of overlapped subject images are identified, the part with overlapping images for this plurality of identified subject images is separated into one or more blocks for segmenting the same area for each of the overlapped subject images, the movement of objects exiting in the block is determined for each of the blocks, and for blocks for which it is determined that there is movement of a specified amount or more by the object by the movement determination unit, one of the subject images of the plurality of overlapped subject images is used and for blocks other than this, the plurality of overlapped subject images is used for generating the still image.

Each of the aspect of the inventions described above may also be regarded as a computer program and as a recording medium on which a computer program is recorded. As the recording medium, it is possible to use various media that can be read by a computer such as a flexible disk, a CD-ROM, an IC card, a punch card or the like. By doing this, it is possible to generate still images using the image parts with little distortion. As items correlating to the computer program and the recording medium, it is clearly possible to include cases such as saving in a recording device such as a hard disk placed on a network so as to be able to be read and executed by another computer via the network.

BRIEF DESCRIPTION OF THE DRAWINGS

FIG. 8 is a flow chart showing an example of the process of calculating the maximum rectangular still image of the specified aspect ratio.

DESCRIPTION OF THE PREFERRED EMBODIMENTS

Figure 1:
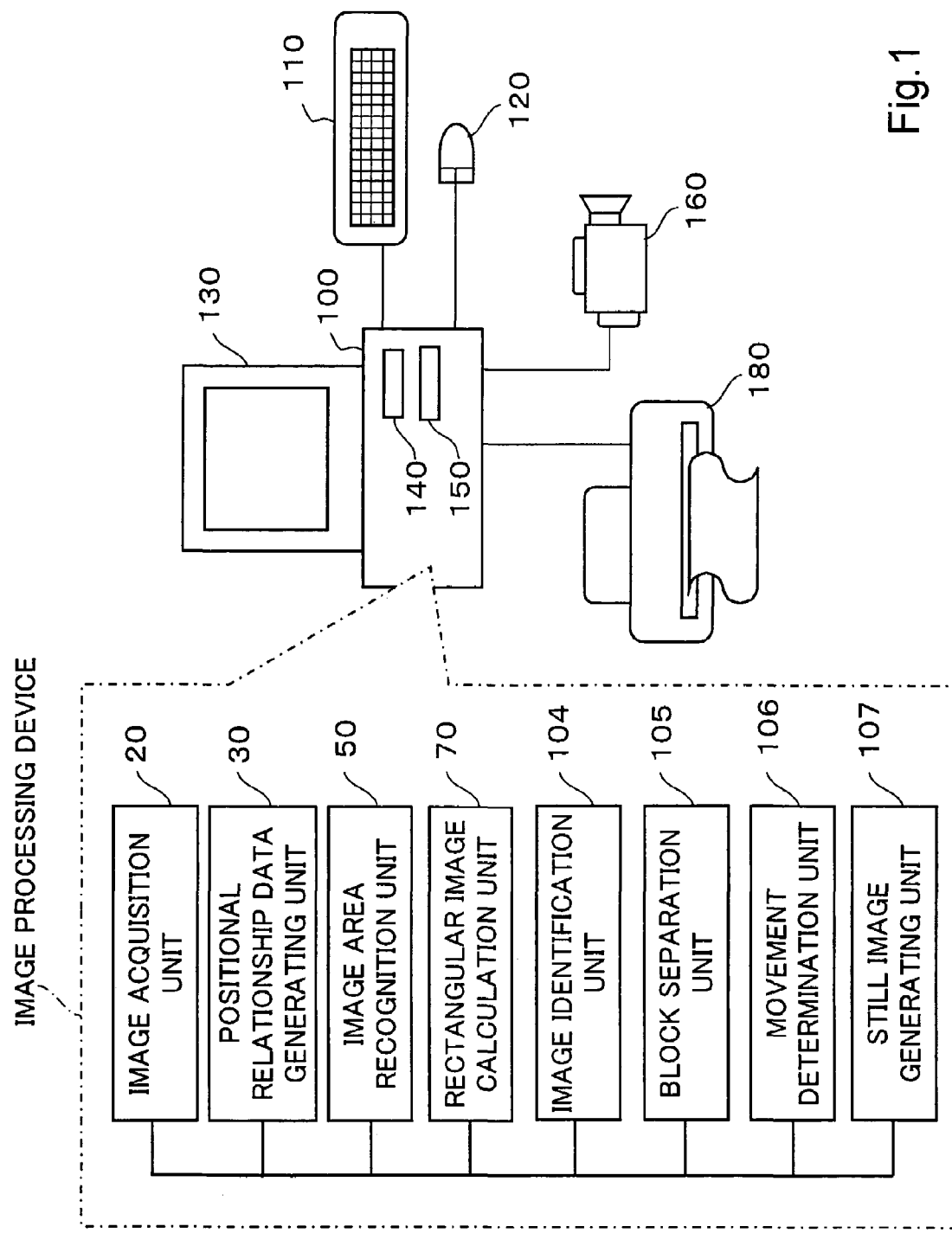
FIG. 1 is a schematic structural drawing of an embodiment of the present invention.

Aspects of implementing the present invention will be described based on embodiments. FIG. 1 is an explanatory drawing showing the schematic structure of the image processing device as one embodiment of the present invention. This image processing device is formed using a general purpose computer, and comprises a keyboard 110 and a mouse 120 as devices for inputting information to the computer 100, and a display 130 and a printer 180 as devices for outputting information. It also comprises a digital video camera 160 as a device for inputting moving images to the computer 100, and a CD-R/RW drive 140, and a DVD-R/RW drive 150. In addition, when necessary, it is also possible to comprise a drive device for which data can be read from storage medium on which a moving image is stored.

The computer 100 functions as an image processing device by executing an application program for generating a rectangular still image using the frame images that are the subject images acquired from the moving image under a specified operating system. As shown specifically in FIG. 1, it functions as an image acquisition unit 20, a positional relationship data generating unit 30, an image area recognition unit 50, and a rectangular image calculation unit 70 by this application program being executed. Also, by the same or a different application program being executed, it functions as an image identification unit 104, a block separation unit 105, a movement determination unit 106, and a still image generating unit 107. Each of these units may be realized by operation all together or one at a time, but it is possible to function both as a structure for performing rectangular area extraction (mainly consisting of the image acquisition unit 20, the positional relationship data generating unit 30, the image area recognition unit 50, and the rectangular image calculation unit 70) and as a structure for performing the image overlapping process (mainly consisting of the image identification unit 104, the block separation unit 105, the movement determination unit 106, and the still image generating unit 107). Note that with this embodiment, since the subject image to be subject to overlapping is obtained from a moving image, this subject image is called a "frame image" with the description below.

Each unit respectively controls the following processes. The image acquisition unit 20 acquires the plurality of frame images captured from the moving image input to the computer 100 and transfers it to the positional relationship data generating unit 30. The positional relationship data generating unit 30 calculates the relative position between the plurality of frame images and transfers that as data to the image area recognition unit 50. The image area recognition unit 50 checks for image area in which the frame images exist from the transferred relative position data of the plurality of frame images, and transfers those results as data to the rectangular image calculation unit 70. The rectangular image calculation unit 70 calculates the specified rectangular still image of the maximum size that can be generated from the image area data for which frame images exist.

Also, the image identification unit 104 calculates the relative positions of the acquired frame images captured from the moving image input to the computer 100 and identifies the plurality of frame images. The block separation unit 105 separates the stitch part of the frame images block images, and transfers these to the movement determination unit 106. The movement determination unit 106 determines the movement of the objects of the frame images for each of the separated blocks. The still image generating unit 107 uses specified frame images from the processing results of each unit and generates still images larger than one of the frame images (hereafter simply called "still images").

Following, the process performed by the image processing device of this embodiment will be described in the following order.

(A) Image Acquisition Unit 20 and Positional Relationship Data Generating Unit 30:
(B) Image Area Recognition Unit 50:
(C) Rectangular Image Calculation Unit 70:
(D) Image Acquisition Unit 20 Variation Example:
(E) Image Stitching Process:
(F) Stitching Process Variation Example:

(A) Image Acquisition Unit 20 and Positional Relationship Data Generating Unit 30:

The process of fetching a plurality of frame images from the moving image and of generating the relative positions thereof as coordinate data is performed by the image acquisition unit 20 and the positional relationship data generating unit 30. This process is described using the flow chart of FIG. 2. When the process starts, first, a standard frame image is specified that is the standard image for the rectangular still image created by stitching a plurality of frame images, and the fetching process is performed at the computer 100 (step S31). Specification of the standard frame image is performed by the operator of the image processing device (hereafter simply called the "operator") inputting data using the keyboard 110 or the mouse 120. In specific terms, the moving image is displayed on the display 130, this moving image is stopped at a specified position (elapsed time), and the displayed frame image is specified as the standard image. For specification of the standard image, in addition to this, it is also possible to display frame images in sequence by doing frame advancing, for example, and having the operator specify the image thought to be suitable, or by displaying in a film strip state each frame of the moving image or the frames extracted at specified intervals, and having the operator select these.

For the standard frame images specified in this way, next, from the frame images continuing before and after that, the first frame image and the last frame image are specified used for creating the rectangular still images, and the fetching process is performed at the computer 100 (step S32). The same as with the fetching of the standard frame images, the operator inputs and specifies data by using the keyboard 110 or the mouse 120. For example, it is possible to specify the five frames before and after the standard frame, or to directly specify the image before and after displayed in the film strip state.

As a method for specifying each frame image, in addition to this, other possible methods include a method of specifying an identification number of the normally allocated frame image when capturing the frame image from the moving image and fetching it to the computer 100, or a method of automatically fetching a preset number of still images at a specified time interval from the continuous frame images before and after the specified standard frame image. The process noted above correlates to the process of the image acquisition unit 20.

Next, the process of calculating the relative position between each frame image is performed for the plurality of frame images including the standard frame image specified by the operator (step S35). The relative positions of all the frame images are obtained by calculating the positional relationship between the two frame images described later for the fetched plurality of frame images. With this embodiment, the relative position of the specified standard frame image and the plurality frame images is calculated one at a time, and the relative position of all the frame images is calculated.

Figure 3:
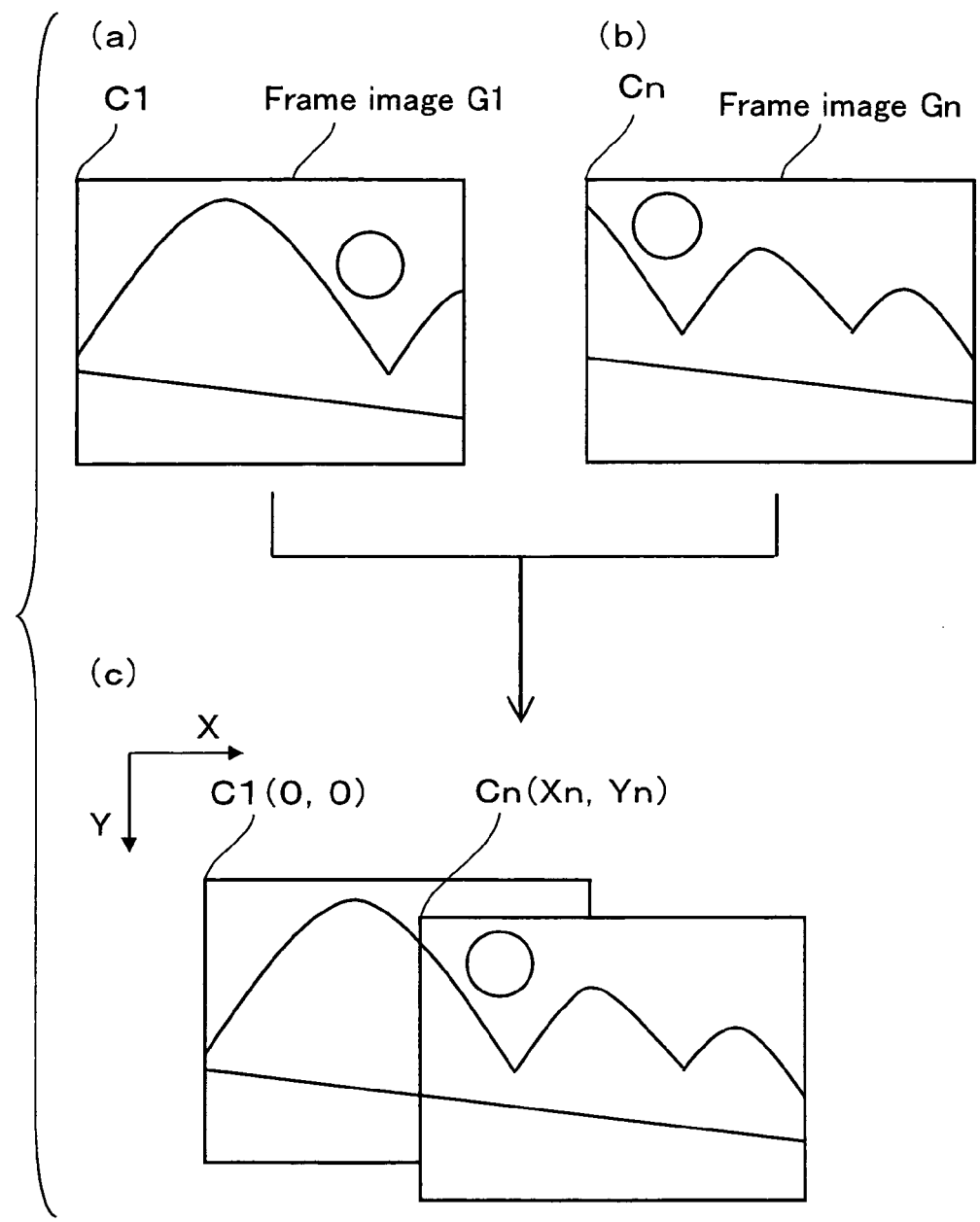
FIG. 3 is an explanatory drawing showing the calculation of the relative positions of the frame images for the embodiment.

The process of calculating the relative position between the two frame images is described using FIG. 3. FIGS. 3(a) and (b) respectively show the two images frame image G1 and frame image Gn. The two images in the drawings are fetched from a moving image that captures a mountain scene with the setting sun as the background captured while panning the camera from the upper left toward the lower right. The relative positional relationship of the two frame images can normally be understood in almost all cases by assuming the three cases of the translational displacement that can be understood as parallel movement, the rotational displacement that can be understood as the rotation around a specified rotation center, and the image magnification rate displacement that can be understood as the change in the relative size that occurs with zooming. In the case of the two images obtained by panning the camera shown as an example in FIGS. 3(a) and (b), from the fact that there is no rotational displacement or magnification rate displacement between the two items, as the translational displacement, in other words, the positional displacement of the two items, it is possible to obtain this as the translational vector.

In specific terms, the translational vector can be realized as a pixel count set representing the pixel displacement in the horizontal direction and the vertical direction between the two images. This kind of pixel count displacement may be generated by known processing technology of image pattern matching or characteristic point tracking. When the relative position data calculated from the translational vector generated in this way is pixel count Xn in the screen horizontal (X) direction and is pixel count Yn in the screen vertical (Y) direction, when the reference point (0, 0) is the screen upper left corner C1 of the frame image G1, the screen upper right corner Cn of the frame image Gn has the coordinates (Xn, Yn). This state is shown in FIG. 3(c). In this way, the relative position of the frame image Gn in relation to the frame image G1 is calculated.

Also, when the rotation or the image magnification rate differs between the frame image G1 and the frame image Gn, it is possible to calculate the relative position by combining optical flow estimation and pattern matching, for example. There are various methods for optical flow estimation, and for example with the gradient (gradient based) method, under the assumption that the brightness of the subject is variable between the observed frame images, an estimate is made of the movement of the object with the capturing device as the standard using the relationship between the spatial gradient and the time gradient of the concentration distribution of the subject in the image. Based on the results of this optical flow estimate, a rough estimate is made of the image translational movement or the change in the rotation and zoom magnification, and also, image processing is performed based on these estimation results so that the frame image has the same magnification rate for the frame image G1 and the frame image Gn, and with the frame image G1 and the frame image Gn, by performing pattern matching between these images, the relative position was newly calculated for the frame image after image processing.

Figure 2:
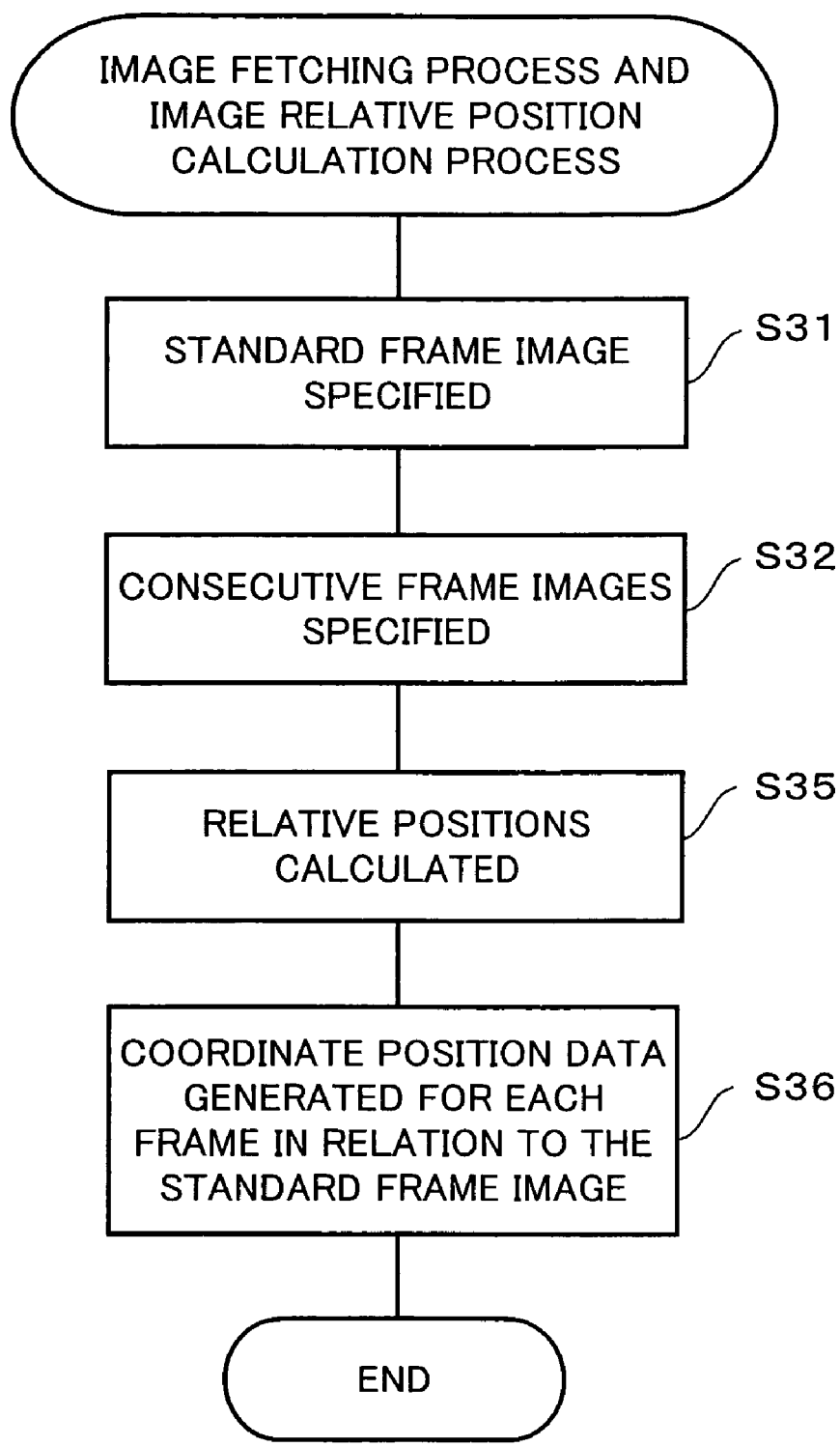
FIG. 2 is a flow chart showing an example of the processing of the still image generating device with the embodiment.

As described above, between the standard frame image specified by the operation and all the other frame images, the process of calculating the relative position between two frame images is performed with performance of correction of the rotation and image magnification of the frame images. Then, the X and Y coordinate data of the upper left corner of the other frame images when the upper right corner of the screen of the standard frame image specified by the operator is the origin point (0, 0) are generated as the positional relationship data (FIG. 2, step S36). These processes correlate to the process of the positional relationship data generating unit 30. This positional relationship data obtained in this way is supplied for the processing of the image area recognition unit 50 together with the frame images.

(B) Image Area Recognition Unit 50:

Next, the process of the image area recognition unit 50 will be described. With the image area recognition unit 50, all of the frame images specified by the operator are arranged in one image area based on the X and Y coordinate data, and a process is performed for recognizing image area that is the logical sum of all the frame image, in other words, the area in which exists images for which it is possible to stitch all the frame images. This process is described using the flow chart of FIG. 4. When the process starts, first, all the frame images undergo the process of being arranged based on the X and Y coordinate data of the upper left corner which is the positional relationship data generated at process step S36 (FIG. 2) (step S51). For example, all the frame images specified by the operator are the four (F1 to F4) consecutive frame images with equal image magnification, and when the standard frame image is assumed to be F2, as shown in FIG. 5(a), based on the X and Y coordinate data with the screen upper left corner of the standard frame image F2 as the origin point (0, 0), the other three frame images which are the frame image F1, the frame image F3, and the frame image F4 are arranged respectively at the coordinate positions (X1,Y1), (X3,Y3), and (X4, Y4).

Figure 4:
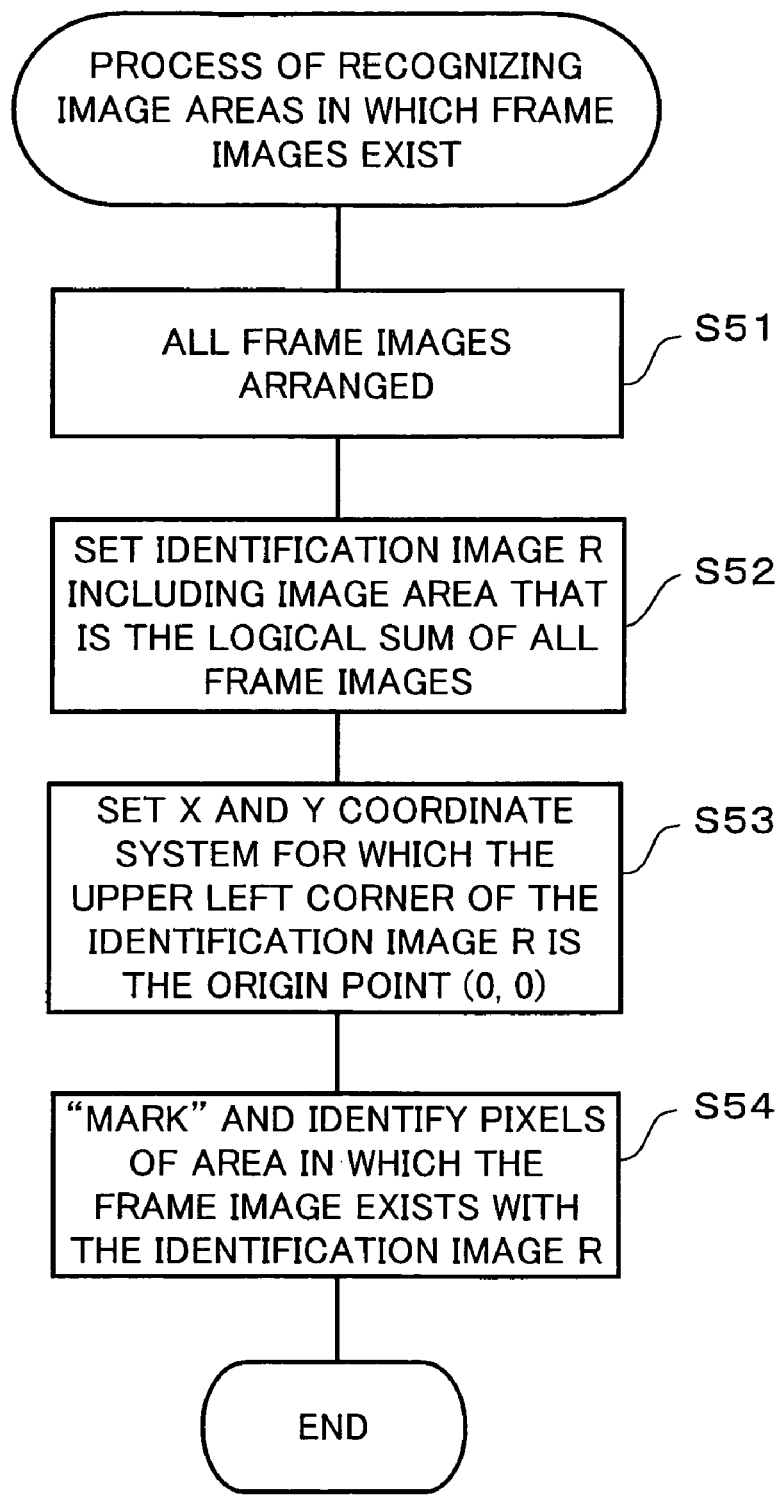
FIG. 4 is a flow chart showing an example of the processing by the positional relationship data generating unit for the embodiment.
Figure 5A:
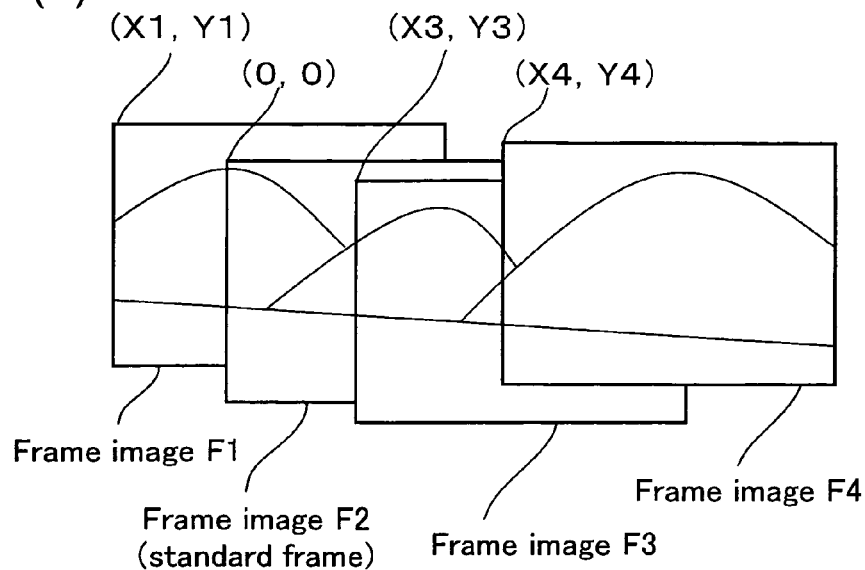
FIG. 5(a) through 5(c) are explanatory drawings showing the arrangement of the frame images and the setting of the image area R.
Figure 5B:
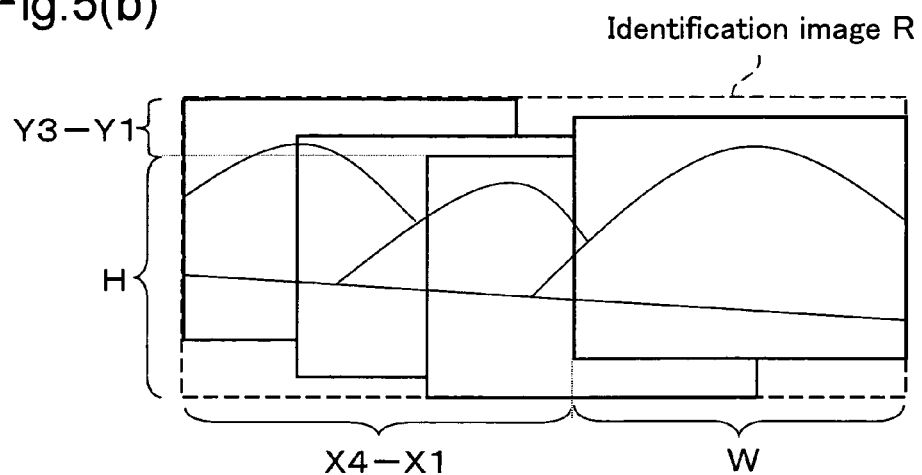

Next, as shown by the dotted line in FIG. 5(b), a process is performed for setting the rectangular identification image R including the image area that is the logical sum of all the arranged frame images (FIG. 4, step S52). Here, the identification image R is preferably set to have the size be as small as possible. This is because it reduces the load of the process of adding a "mark" to the pixels (step S54) that form the identification image R described later. With this embodiment, the minimum rectangular image for which all of the frame images are held inside is set as the identification image R. From the start, as long as the image is of a size in which all the frame images are contained, any shape or size is acceptable.

Figure 5C:
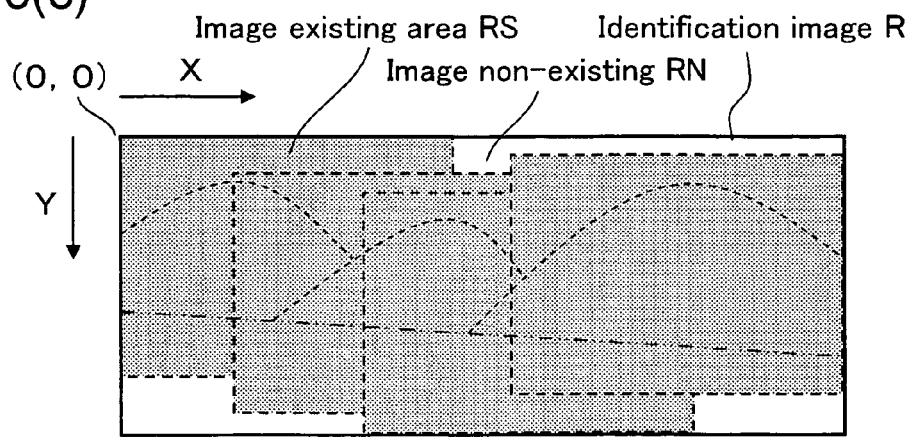

With this embodiment, the size of the identification image R is obtained from the X and Y coordinate data of all the frame images and from the screen size of the frame image. When an image is assumed for which imaging is done by panning up, down, left, and right as shown in the example of FIG. 5 for each frame image, there is no difference in the rotation or image magnification, and this can be considered to have no difference in screen slant or screen size for all of the frame images. Therefore, as shown in FIG. 5(*b*), the vertical length of the identification image R is the Y direction length of the frame image, in other words, the vertical screen length H added to the difference between the maximum value and the minimum value (Y3-Y1) of the Y coordinate value of the screen upper left corner of all the frame images. Also, the horizontal length of the identification image R is the X direction length of the frame image, in other words, the horizontal screen length W added to the difference between the maximum value and the minimum value (X4-X1) of the X coordinate values of the screen upper left corner of all the frame images. With this embodiment, the size of the identification image R was obtained in this way. Note that when including frame images for which the rotation and image magnification are corrected, it is possible to check the individual relative positions of each frame image and the screen slant and size one at a time to obtain the vertical length and horizontal length of the identification image R.

Next, to store areas in which frame images do exist and areas in which they do not exist in the set identification image R, a process is performed of resetting the image area that is the logical sum of all the frame areas (hereafter, this is called the "image existence area") as a coordinate system with the identification image R as the standard (step S53). In other words, as shown in FIG. 5(*c*), the process is performed of resetting the image existence area to an X and Y coordinate system which has the screen upper left corner of the identification image R as the origin point (0, 0). With this process, the image existence area has X and Y coordinate data that is common to the identification image R. By doing this, it is possible to differentiate the image areas in which frame images do exist and image areas in which frame images do not exist for the identification image R by whether inside or outside the image existence area.

For the identification image R including image existence areas for which the coordinates were reset in this way, of the pixels that form the identification image R, a "mark" is added to the pixels that are entirely included in the image existence area to identify them, and a process is performed to differentiate the areas in which frame images do not exist (step S54). With this process, it is possible to identify the presence or absence of the existence of frame images by the presence or absence of the "mark" added to the pixels that form the identification image R. This is the so-called labeling process for image recognition.

The size of the pixels that form the identification image R is preferably set to be small so as to reduce the identification errors of the image existence areas. With this embodiment, to differentiate inside or outside the image existence areas with little error, the identification image R is set as an image with the same resolution as the frame image. Then, as described above, to check the area in which frame images reliably exist, a "mark" is added to pixels which are entirely contained in the image existence area of the pixels that form the identification image R. From the start, the size of the pixels that form the identification image R may be set from the load of the process performed by the rectangular image calculation unit 70 described later and the identification discrepancy of the image existence areas. It is also possible to use the pixels for which the pixel center is included or pixels for which a specified area ratio is included for the pixels to "mark."

Allocation of the "mark" may be performed using Various methods. For example, a possible method is to have all the pixels of the identification image R that exist within the screen of the frame image have pixel data "1," and to have the other be pixel data "0" as the performing of a binarization process, and by doing this, to have the image data "1" be the "mark." Alternatively, another possible method is to add RGB data to the pixels, and to have at least one data of this RGB data be the "mark." In FIG. 5(*c*), an example is shown of the identification image R differentiated into the pixel areas "marked" in this way, in other words, the image existing area RS in which frame images do exist (the part with shading) and the image non-existence area RN in which they do not exist. The process above correlates to the process of the image area recognition unit 50.

Figure 6:
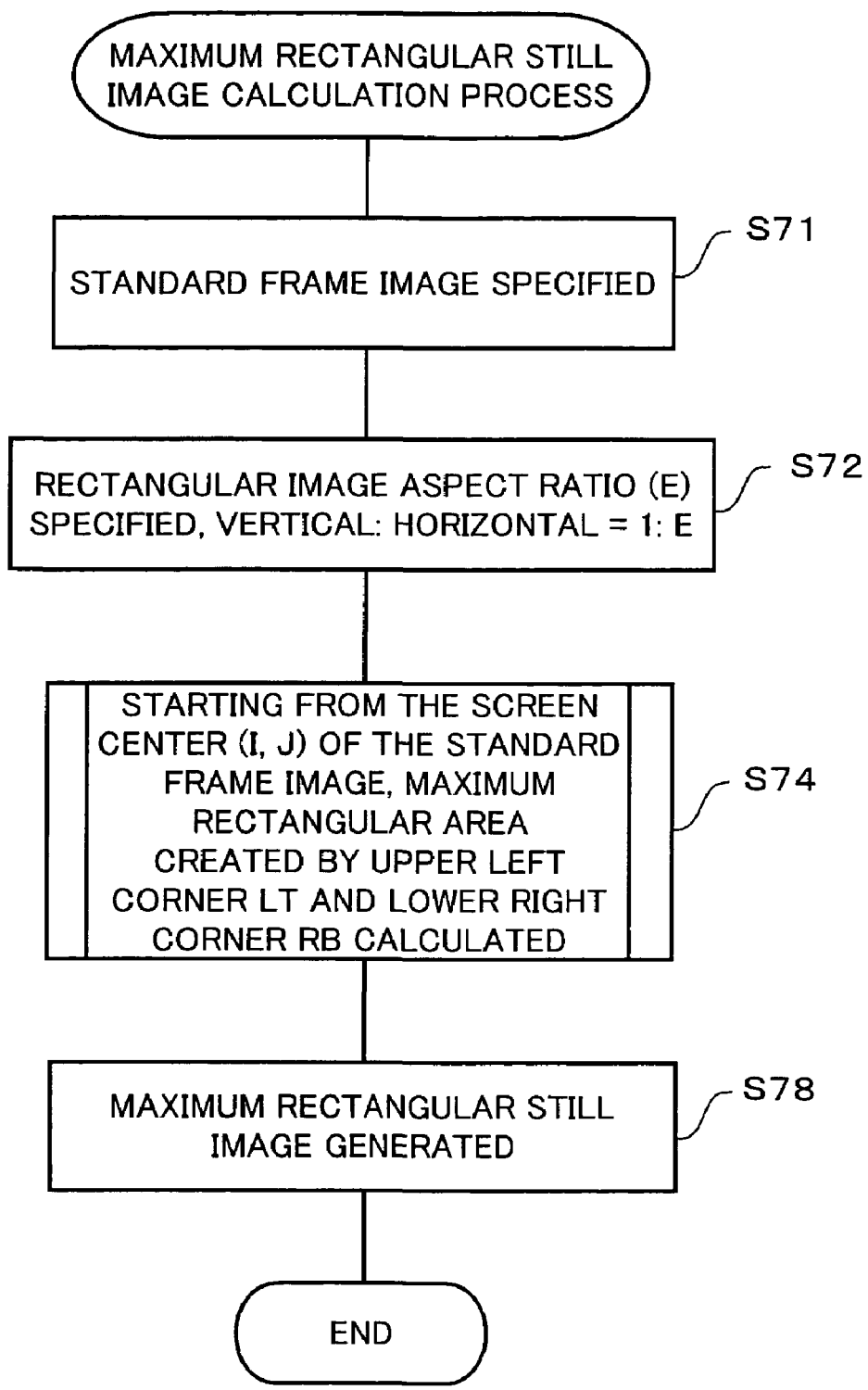
FIG. 6 is a flow chart showing an example of the processing by the image area storage unit for the embodiment.

(C) Rectangular Image Calculation Unit 70:

Next, with the rectangular still image specified by the operator, a process is performed of calculating the largest screen size that can be generated from the image existing area RS. This process performed by the rectangular image calculation unit 70 is described using the flow chart of FIG. 6. First, the process of specifying the standard frame image that is the standard for the rectangular still image is performed (step S71). For the standard frame image, normally the item specified by the operator at the process step S31 (FIG. 2) is specified by default, but when changing the standard frame image, data is input and specified using a keyboard 110 or the like here.

Next, the process of specifying an aspect ratio of the rectangular still image that is finally generated is performed (step S72). The specification method is performed by the operator inputting the desired aspect ratio E as data using a keyboard 110 or the like. With this embodiment, the aspect ratio E has the horizontal length for the time that the vertical length was 1.

Figure 7:
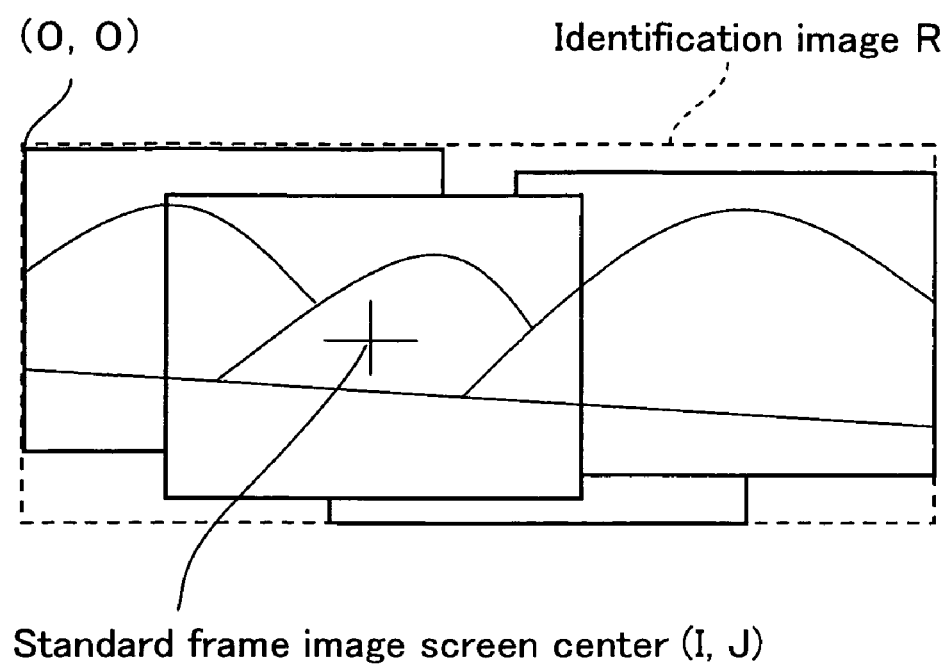
FIG. 7 is an explanatory drawing showing the screen center of the standard frame image for the embodiment.

The maximum rectangular still image of aspect ratio E including the standard frame image is calculated according to the standard frame image and the aspect ratio E specified by the above process, so as shown in FIG. 7, a process is performed of calculating the maximum rectangular area from the coordinates (I, J) of the screen center of the standard frame image (step S74). The coordinates (I, J) are the X and Y coordinates with the upper left corner of the screen of the identification image R as the origin point (0, 0).

The process of calculating the maximum rectangular area (step S74) is a process whereby within the identification image R, from the standard pixel for starting calculation, expansion is done one pixel at a time alternately in the respective screen up and down (±Y) directions, expansion of the area by the length for which the specified aspect ratio E is multiplied by the vertical length of one pixel is done in the screen left and right (±X) directions, and while performing this kind of area expansion process, the pixels that exist within the rectangular area created by the screen upper left corner LT and the lower right corner RB are checked to see if all pixels have a "mark," and by doing this, the rectangular area of the maximum size that satisfies the conditions is calculated.

The process here is described using the flow chart of FIG. 8. When this process starts, first, the variables m and n are set to the initial value 0 (step S741). The variables m and n represent the pixel count that increases in the screen upward direction and the pixel count that expands in the screen downward direction from the standard pixel that is the standard for starting the process. The reason that the variables m and n are set to the value 0 is to make this the start status of the rectangular area calculation process, in other words, the status of only one pixel of the standard pixel.

Figure 10:
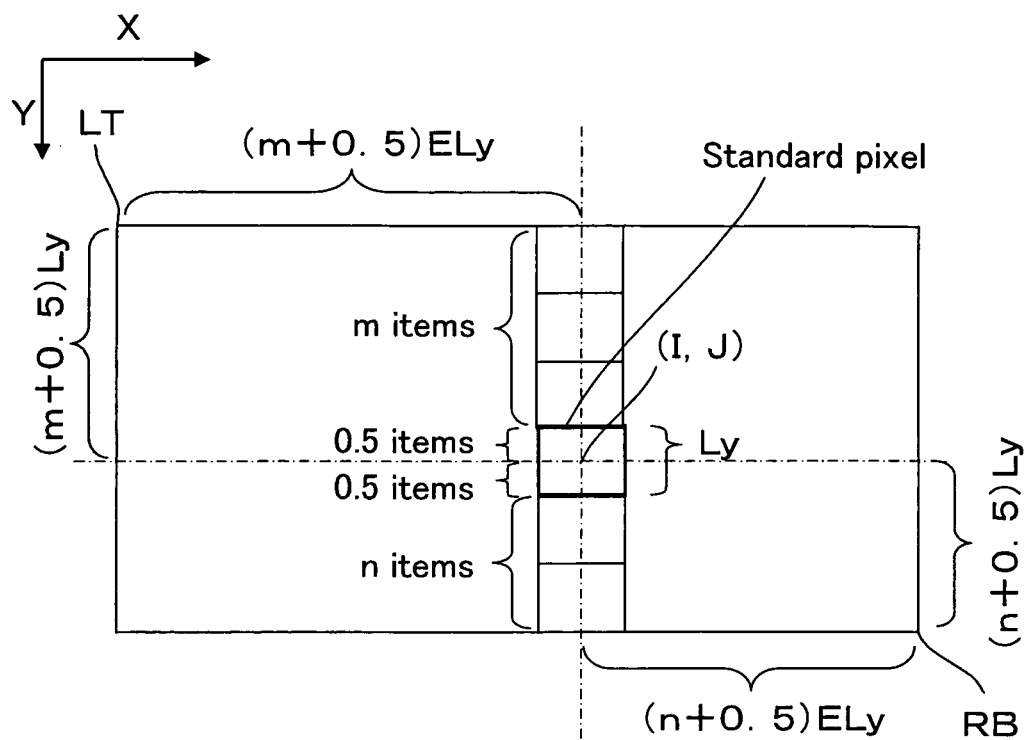
FIG. 10 is an explanatory drawing showing the position of the upper left corner point LT and the lower right corner point RB for calculation of the maximum rectangular area.

Next, to find the maximum rectangular area to be calculated by searching from the screen center (I, J) of the standard frame image and calculating, the process of setting the standard pixel X and Y coordinates to (I, J) is performed (step S742). As shown in FIG. 10, when the center coordinates of the standard pixel are (I, J), the coordinates of the upper left corner point LT and the lower right corner point RB of the rectangular area stipulated by the variables m and n are obtained using the following equations (1) and (2).

$$LT\ (I-(m+0.5)\ ELy, J-(m+0.5)\ Ly) \quad (1)$$

$$RB\ (I+(n+0.5)\ ELy, J+(n+0.5)\ Ly) \quad (2)$$

Here, E is the aspect ratio, and Ly is the vertical length of one pixel. Therefore, the LT and RB coordinate values are set in this way, and the calculation of the maximum rectangular area starts from the screen center of the standard frame image.

Note that for the identification image R, there are cases when the screen center (I, J) of the standard frame image and the center of the standard pixel do not match depending on the standard frame image arrangement position and the screen size. In this case, it is possible to move the standard frame image screen center to the pixel center of the standard pixel and to perform the next process step. The screen center is displaced by a maximum of 0.5 pixels, but this can be corrected as necessary after the process of calculating the maximum rectangular area.

After the process described above ends, by alternately increasing the variables m and n respectively one at a time, while sequentially expanding the rectangular area with the upper right corner point LT and the lower left corner point RB at opposite angles, the presence or absence of a "mark" added to the pixels within that rectangular area is checked. If a "mark" is added to all the pixels within the rectangular area, the rectangular area stipulated by the upper right corner point LT and the lower left corner point RB is expanded, and if a pixel for which a "mark" is not added is found in the pixels within the rectangular area, the process stops there. Following, this process is described in detail.

Figure 11:
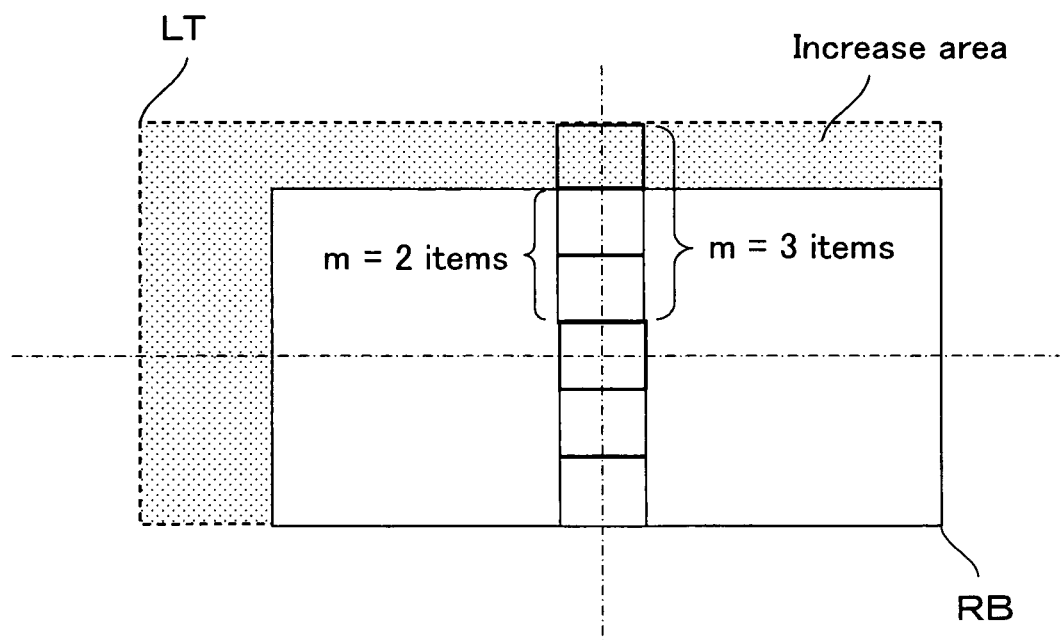
FIG. 11 is an explanatory drawing showing an example of the increased area for checking the presence or absence of the frame image.

First, the process of expanding the screen from the standard pixel in the one pixel screen upward direction is performed (FIG. 8, step S743). In specific terms, the variable m is increased by one. At this time, a check is done for the existence of frame images in the rectangular area created by the upper left corner point LT and the lower right corner point RB (step S744). Therefore, while increasing the variable m, step S744 is executed many times. FIG. 11 shows an example of the third time of the process of increasing the variable m (step S743), in other words, the state of the variable m increasing from value 2 to value 3. In relation to when the variable m was value 2, the increase area that results in the screen top area and left area shown by the shaded part is an image area that is newly increased by the expansion of the screen with the variable m set to value 3. Therefore, it is sufficient to check for the presence or absence of a "mark" only for pixels contained in this increase area which is increased each time the variable m increases by one.

The pixels contained in the increase area are increased one pixel at a time in the screen vertical direction, in other words, Ly at a time, so the border of the pixels and the border of the increase area always match, but the screen horizontal direction increases value E • Ly at a time multiplied by the aspect ratio E, so there are cases when the border of one pixel in the horizontal direction and the border of the increase area do not match. With this embodiment, if the pixel has the pixel center contained in the increase area, it is a subject of checking for the presence or absence of a "mark." From the start, it is also possible to do checking only on pixels for which the entire pixel is contained in the increase area. It is also possible to set the screen ratio of the pixels included in the increase area in advance and check.

In this way, checking of the presence or absence of the existence of frame images with the increase area is done by the presence or absence of pixel "marks," and the process of determining whether or not there are frame images (there are "marks") in all the rectangular areas created by the upper left corner point LT and lower right corner point RB is performed (step S745). As a result of the determination, when there are pixels with no "mark," (step S745: No), this is considered to have the rectangular area expanded too much, and the variable m is decreased by the value 1 (step S746). Specifically, the position of the upper left corner point LT returns to one position previous. In this way, the process advances to the next step. On the other hand, when the result of the determination is that there were determined to be "marks" for all of the pixels (step S745: Yes), the position of the upper left corner point LT is left as is and the process advances to the next step.

Next, the process of expanding the screen in the one pixel screen downward direction is performed (step S747). In specific terms, the variable n is increased by the value 1. At this time, a check is done for the presence or absence of the existence of frame images in the rectangular area stipulated by the upper left corner point LT and the lower right corner point RB by the presence or absence of a "mark" in the pixels (step S748). The same as with the state shown in FIG. 11, when the variable n is increased as well, the increase area is an area that is newly increased by the expansion of the screen. There is no specific illustration for the increase area when the variable n is increased by the value 1, but it is easily understood that there will be an increase area at the screen bottom and right part. A check is done for the presence or absence of "marks" for the pixels of this increase area.

The same as with the process step S745, when increasing the variable n as well, a check is done for the presence or absence of "marks" for the pixels in the increase area, and the process of determining whether or not there are frame images in the entire rectangular area created by the upper left corner point LT and the lower right corner point RB is performed (step S750). As a result of determination, when there are pixels with no "mark" (step S750: No), it is determined that the increase area was expanded too much, and the process of decreasing the variable n by the value 1 is performed (step S751). The position of the lower right corner point RB is returned to one position previous. Meanwhile, as a result of determination, when all the pixels have "marks" (step S750: Yes), the position of the lower right corner point RB is not returned, and is left as is to advance to the next step of the process.

Next, to check whether or not the rectangular area created by the upper left corner point LT and the lower right corner point RB has expanded, a determination is made of whether the value m+n which is the sum of the variables m and n is greater than the value during the previous process step (step S755). When the value m+n has not increased (step S755: No), the rectangular area has not expanded, so the rectangular area created by the upper left corner point LT and the lower right corner point RB for which the coordinates are set from the values of the variables m and n at this time is determined to be the maximum rectangular area (step S756), the process shown in FIG. 8 ends, and the process returns to step S78 shown in FIG. 6.

When the value m+n has increased (step S755: Yes), the following process is implemented divided into three cases. First, when both m and n have increased, the position of the upper left corner point LT and the lower right corner point RB are further moved, and the process of checking for the presence or absence of "marks" in the pixels in the increase area is repeated. Therefore, the process returns to the process step S743, and the process noted above (steps S743 to S755) are repeated while respectively increasing the variables m and n by one.

When only the variable m is increased, there are no frame images in the image area outside the position of the lower right corner point RB, so the position of the lower right corner point RB is fixed, and only the process of checking for "marks" of pixels in the increase part after the position of only the upper left corner point LT has moved is performed. Therefore, in this case, as shown in the flow chart of FIG. 9(a), while expanding the screen in the upper left direction, in other words, of the variables m and n, while increasing one at a time only for the variable m, the determination process noted above continues.

Figure 9A:
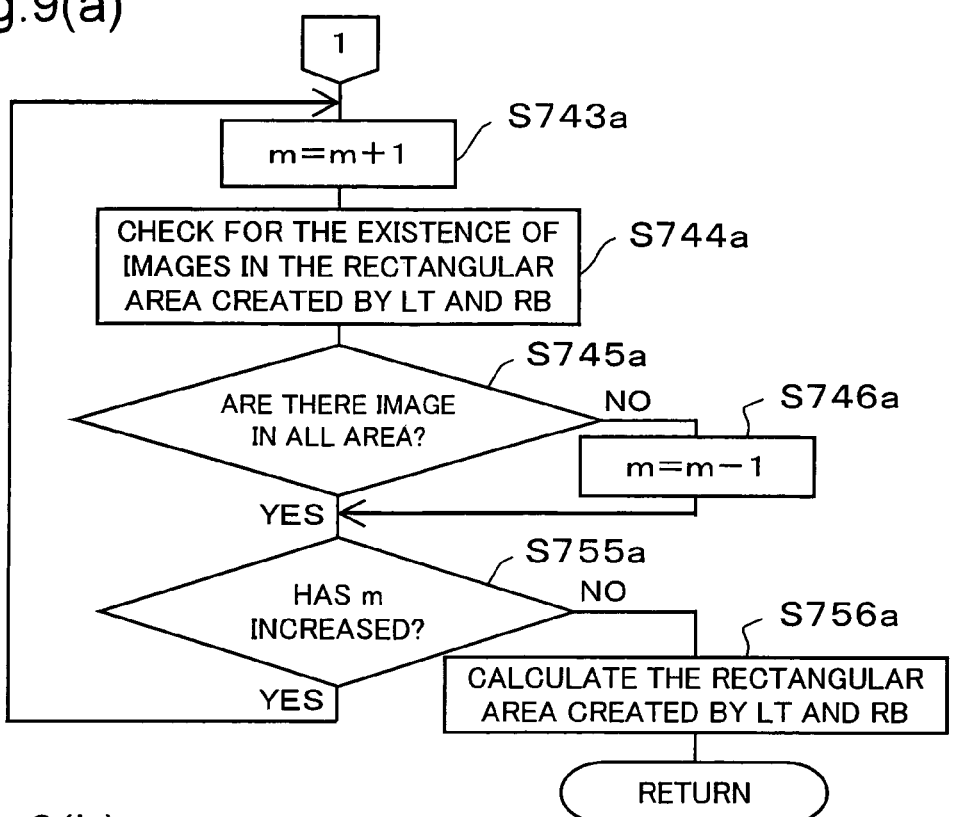
FIGS. 9(a) and 9(b) are flow charts respectively showing an example of the continuing process of calculating the same maximum rectangular still image.

The process performed by the steps S743a to S746a in the flow chart in FIG. 9(a) is basically the same process as that of steps S743 to S746 described using FIG. 8. Therefore, a description of the process performed by each step is omitted. At step S755a, a determination is made of whether or not the variable m has increased, and when it has increased (step S755a: Yes), the process returns to step S743a, and the process continues. When there is no increase (step S755a: No), it is determined that the rectangular area has reached the maximum. Specifically, the rectangular area created by the upper left corner point LT and the lower right corner point RB determined by the coordinate of the values of the variables m and n at this time is regarded as the maximum rectangular area (step S756a), this process routine ends, and the process returns to step S78 shown in FIG. 6.

When only the variable n has increased, there are no frame images in the image area outside the position of the upper left corner point LT, so the position of the upper left corner point LT is fixed, and the process of checking for "marks" in pixels in the increase area after a further move of the position only of the lower right corner point RB continues. Therefore, in this case, as shown in the flow chart of FIG. 9(b), the screen expands in the lower right direction, in other words, of the variable m and n, while increasing one at a time only for the variable n, the determination process noted above continues.

Figure 9B:
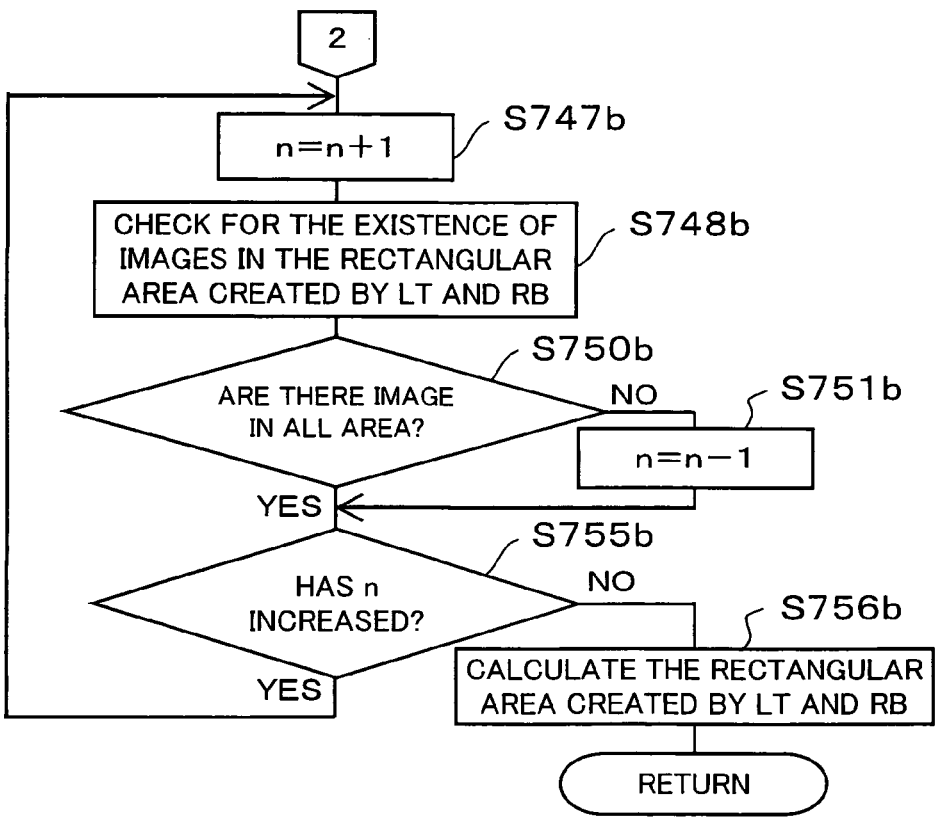

The process performed with the steps S747b to S751b in the flow chart of FIG. 9(b) is basically the same as the process of steps S7474 to S756 described using FIG. 8. Therefore, a description of the process performed by each step is omitted. At step S755b, a determination is made of whether or not the variable n has increased, and when it has increased (step S755b: Yes), the process returns to step S747b, and the process continues. When it has not increased (step S755b: No), it is determined that the rectangular area has reached the maximum. Specifically, the rectangular area created by the upper left corner point LT and the lower right corner point RB for which the coordinates are determined from the values of the variables m and n at this time is regarded as the maximum rectangular area (step S756b), this process routine ends, and the process returns to step S78 shown in FIG. 6.

As described above, while determining the situation of the increase of the variables m and n, each of the set processes is repeated, the process of calculating the maximum rectangular area created by the upper left corner point LT and the lower right corner point RB (FIG. 6, step S74) ends, and the process advances to the next process step S78.

Figure 12:
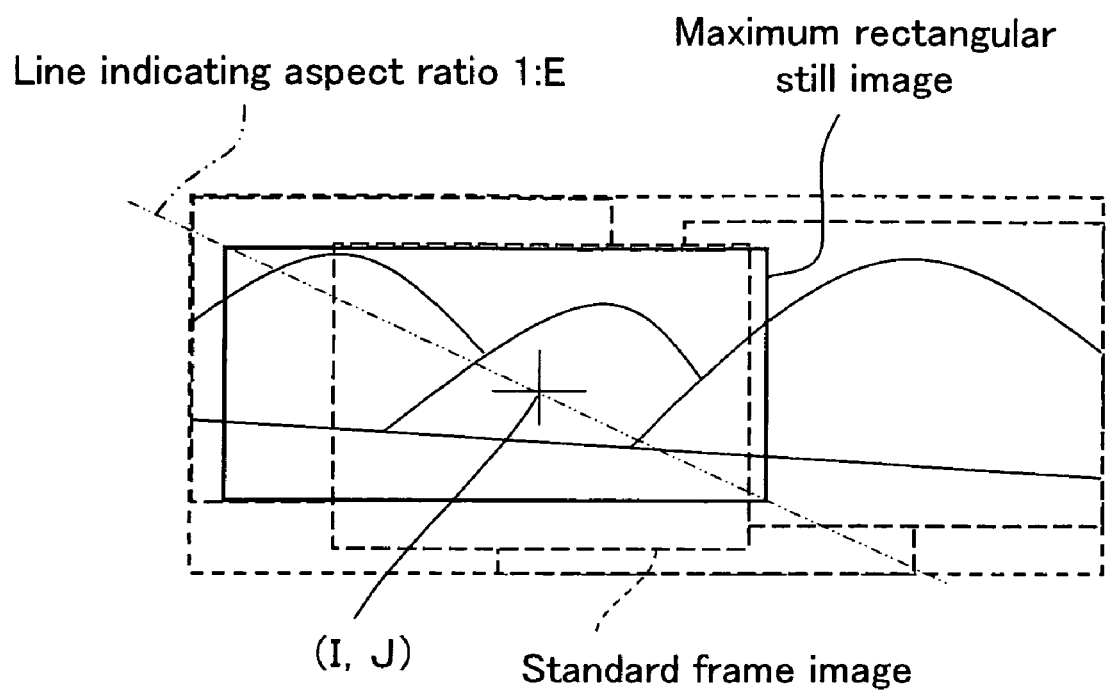
FIG. 12 is an explanatory drawing showing an example of the maximum rectangular still image generated with the embodiment.

At step S78, the screen part contained in the maximum rectangular area determined within the identification image R from the plurality of frame images specified by the operator is cut off, and a process is performed for generating the maximum rectangular still image of the specified aspect ratio. FIG. 12 shows the maximum rectangular still image having the aspect ratio E that can be generated from the plurality of frame images shown as examples in FIG. 7. The diagonal imaginary line in the drawing is a line indicating the aspect ratio 1:E for the screen of the rectangular still image. As described above, when there is displacement of the screen center of the standard frame image in relation to the pixel center that forms the identification image R, an image is generated with correction as necessary. Above, the process by the rectangular image calculation unit 70 ends, and all of the processes performed by the image processing device of this embodiment end.

In this way, with this embodiment, it is possible to automatically calculate the maximum rectangular still image that can be generated from the plurality of specified frame images and the aspect ratio, so it is possible for the operator to easily obtain the desired shape and size rectangular still image.

(D) Image Acquisition Unit 20 Variation Example:

As a variation example of this embodiment, for the process of the image acquisition unit 20, when fetching the plurality of frame images from the moving image, described will be a constitution whereby fetching is done by cutting off the peripheral images at a specified ratio.

Figure 13:
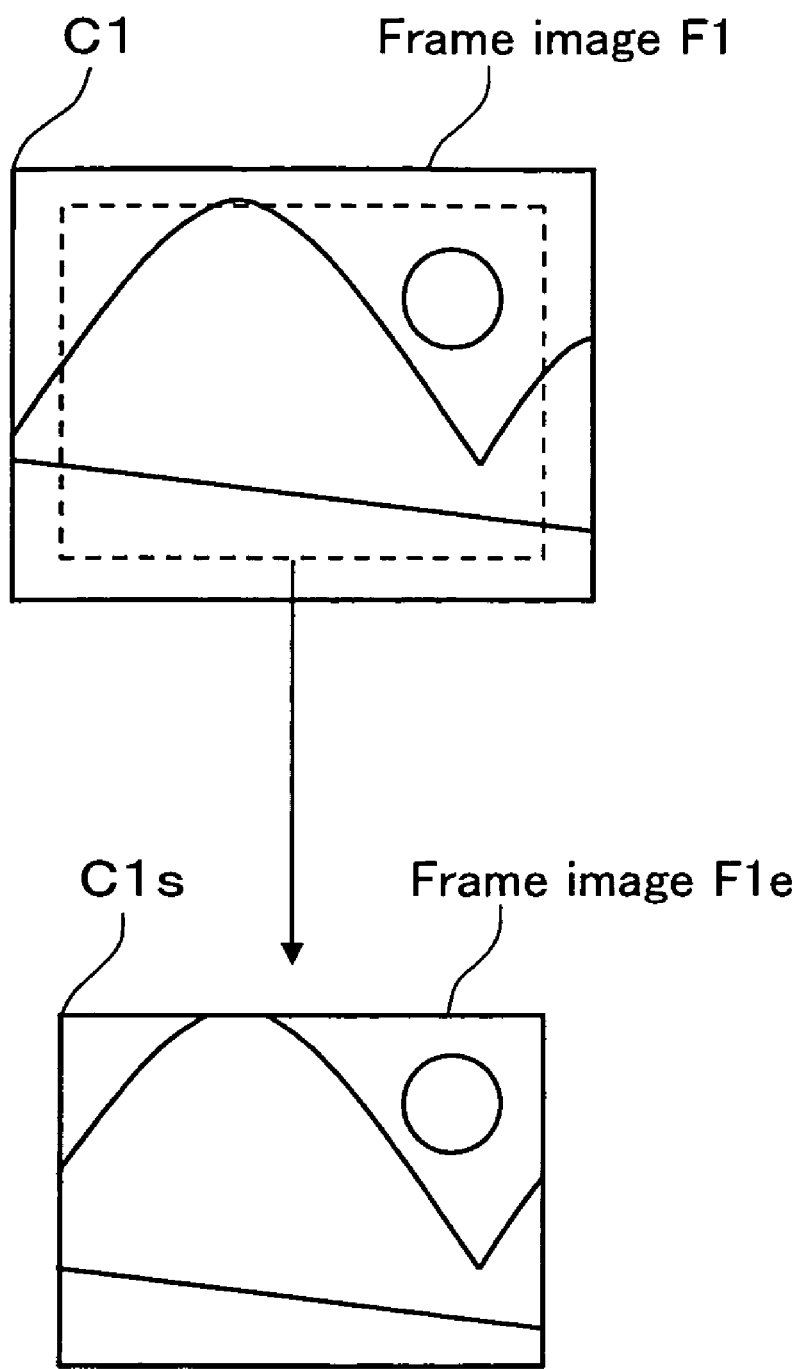
FIG. 13 is an explanatory drawing showing the cutting off of the periphery of the frame images for a variation example.

The process as this variation example may be implemented when fetching the frame images at steps S31 and S32 shown in FIG. 2. FIG. 13 shows the fetching state of the frame image F1s obtained by cutting off the periphery for the frame image F1 as an example. With the processes thereafter, all the frame images F1s may be handled as the frame images F1 with the embodiment noted above. When calculating the relative position of the frame images as well, the screen upper left corner position C1s is handled as C1, the same as for all of this embodiment.

There are distortions in the optical systems of lenses and the like such as various aberrations, light volume variations and the like. This kind of distortion normally becomes as large as the image periphery. With this variation example, the fetched screen becomes smaller, but because the still image is generated using the images for which the peripheral distortion part of the image is small, it is possible to generate still images with little distortion. The ratio for the cut off image may be cutting off approximately 20% by the screen area ratio, or may also be set according to the optical performance of the capturing device that originally captured the moving image or by the resolution of the imaging component.

Also, with this embodiment, when calculating the maximum rectangular area, the calculation of the rectangular area in which frame images exist started from the screen center of the standard frame image, but as a variation example, it is also possible to start from other than the screen center. While viewing the standard frame image displayed in the display 130, the operator matches the cursor to the position at which to start the process (not illustrated), and can set this by clicking the mouse 120 or the like. This kind of method is particularly useful when specifying the image part to be included in the rectangular still image to be generated among the standard frame images.

Furthermore, when calculating the maximum rectangular area with this embodiment, at first the variable m was increased by one pixel and the upper left corner point LT was moved, and the calculation process thereafter advanced, but as a variation example, it is also possible to constitute this to first increase the variable n by one pixel. By doing this, the sequence of the increasing pixels is simply reversed, and there is no significant change. Also, with the embodiment noted above, a horizontally long rectangular area is assumed, but it is also possible to find a vertically long rectangular area.

With this embodiment, the maximum rectangular still image having the aspect ratio E specified by the operator was calculated, but as a variation example, it is also possible to calculate the maximum rectangular still image for which the aspect ratio is not specified. The method in this case will be described using FIG. 14. With this embodiment, one pixel at a time was increased in the up and down direction of the screen, and an increase by the length determined by the aspect ratio E automatically was done in the left and right direction of the screen, but with this variation example, the maximum rectangular still image is calculated by increasing one pixel at a time respectively not only in the up and down direction of the screen but also in the left and right direction of the screen.

Figure 14:
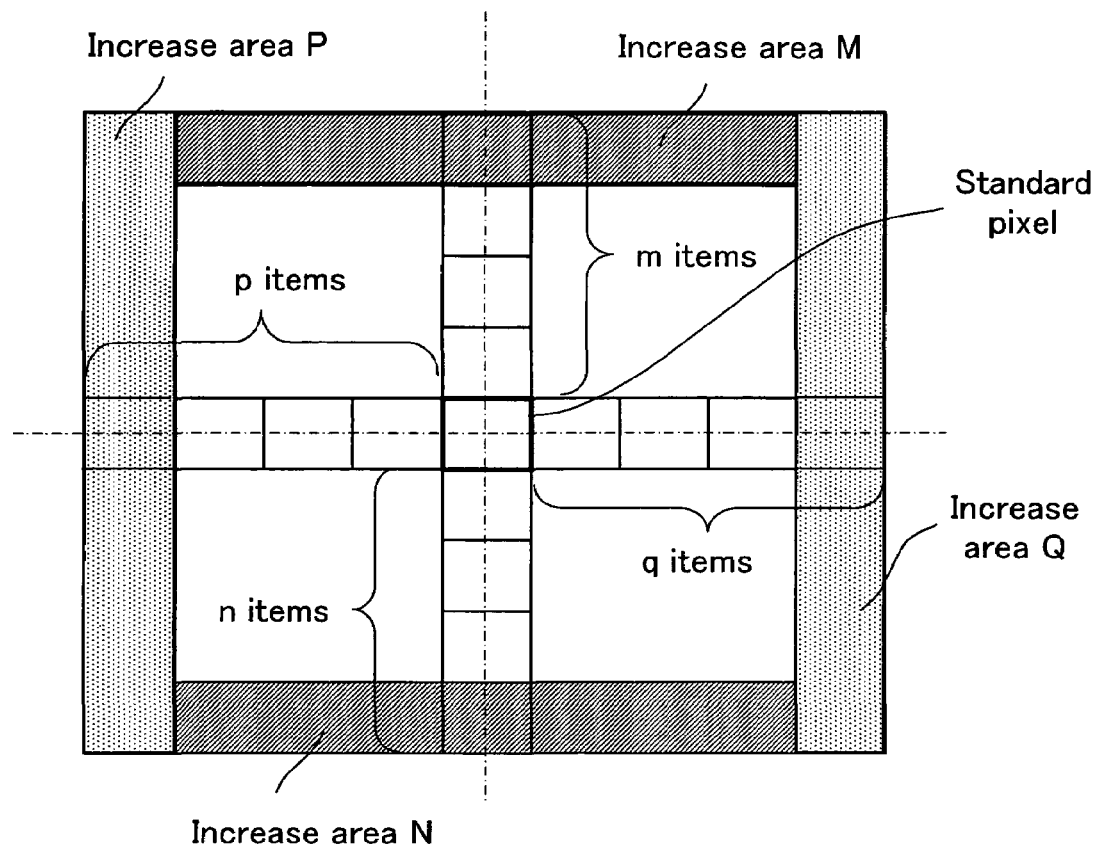
FIG. 14 is an explanatory drawing showing the calculation method of a maximum rectangular still image for which the aspect ratio is not set with a variation example.

As shown in FIG. 14, with this variation example, the same as with this embodiment, the up and down direction of the screen is m items in the upward direction of the screen for the pixel count increasing from the standard pixel, and n items in the screen downward direction, and a process is performed of newly setting in addition to this an increased pixel count of p items in the screen leftward direction and q items in the screen rightward direction. Then, the same as with this embodiment, in the sequence of the variable m and n, after increasing one pixel at a time, there is then an increase one pixel at a time in the sequence of the variables p and q, and a check is done for whether or not a "mark" is added to the pixels respectively for the increase areas M, N, P, and Q shown in FIG. 14. Then, for example, if there are pixels without "marks" in the increase area P, p is fixed at the value decreased by one, and the remaining m, n, and q are increased and a check is done for the presence or absence of "marks" for the pixels for the increase areas M, N, and Q. This process is performed repeatedly, and when all of m, n, p, and q are fixed values, the maximum rectangular area is reached. Also, the sequence for increasing one pixel at a time is not limited to this, and can be replaced by any sequence of m, n, p and q.

Figure 15:
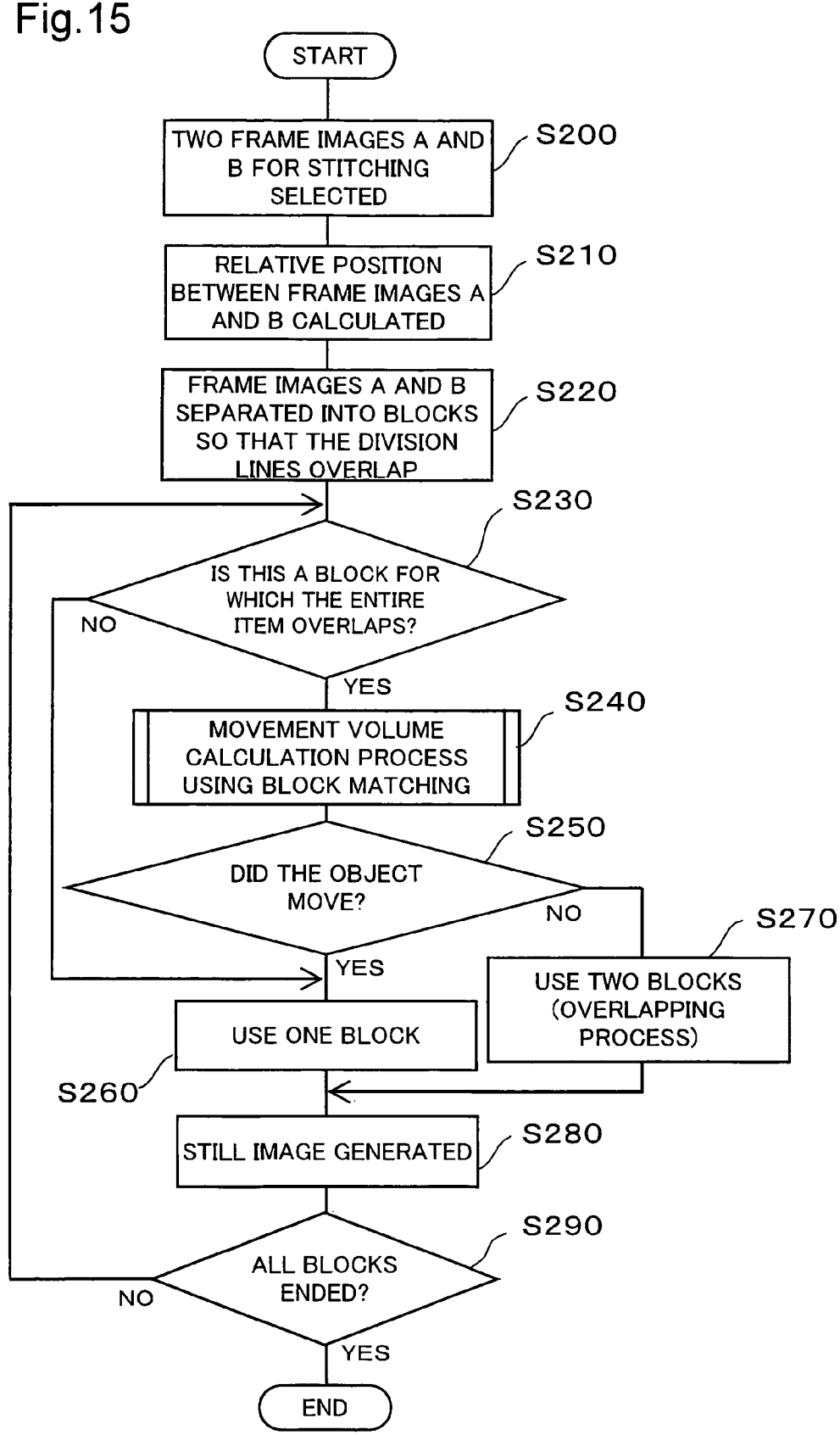
FIG. 15 is a flow chart showing the process of image stitching with this embodiment.

(E) Image Stitching Process:

Next, of the processes performed by the image processing device of this embodiment, the details of the image overlaying process (stitching process) will be described using the flow chart of FIG. 15. This process is implemented as part of the process of step S78 in FIG. 6 of the embodiment described above. When the process shown in FIG. 15 is started, first, the process is performed for selecting the two frame images A and B to be synthesized that are contained in the maximum rectangular area described above (step S200). Note that the process described below may also be implemented alone as the process for forming two images. In this case, based on the instructions from the user, the process of selecting the frame image A and the frame image B for generating a still image is performed using a keyboard 110 or the like on the plurality of frame images acquired from the moving image (step S200). Next, the relative position is calculated for this frame image A and the frame image B (step S210).

Figure 16:
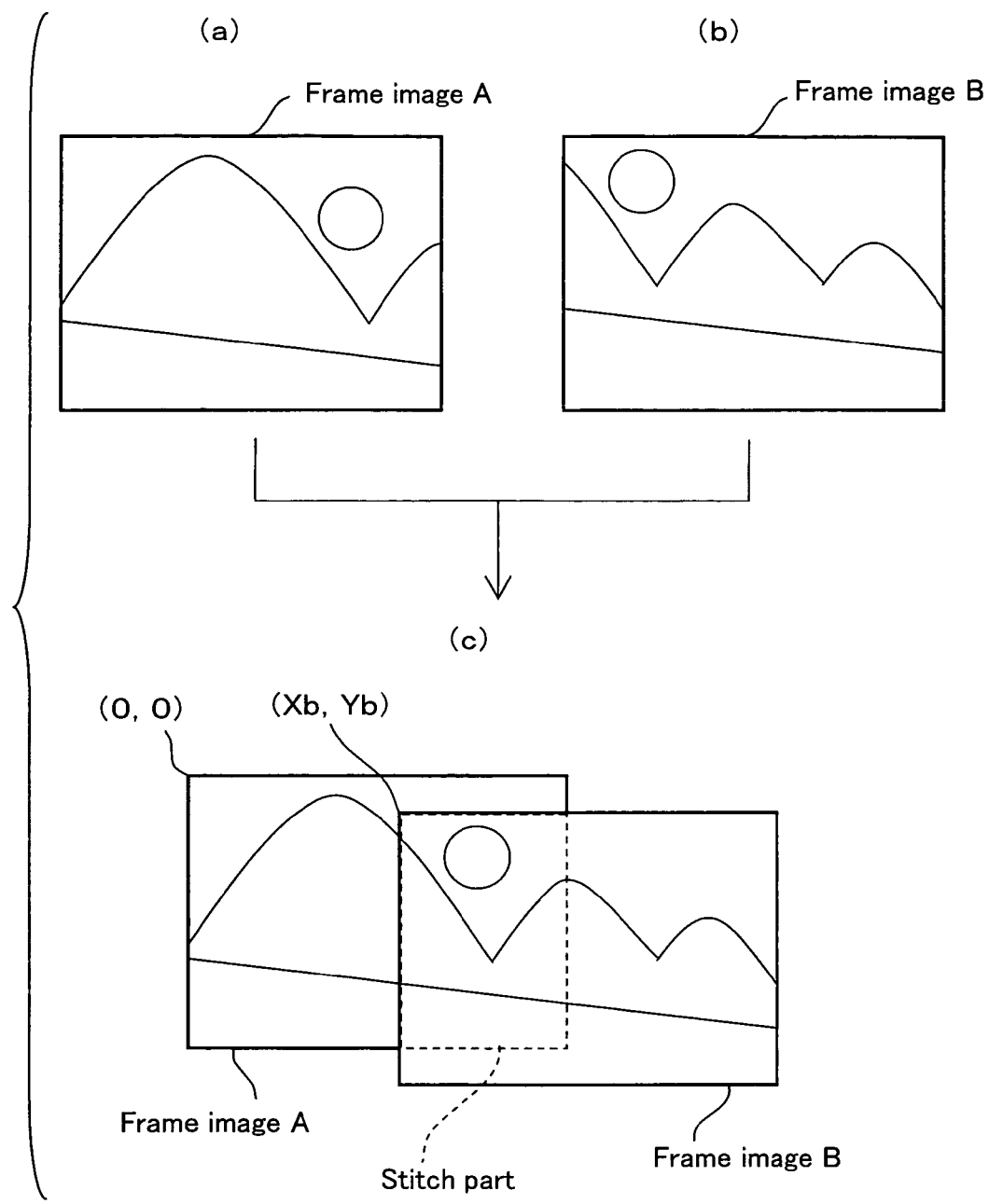
FIG. 16 is an explanatory drawing showing the calculation of the relative positions of the frame images with this embodiment.

The process of the calculation of the relative position is described using FIG. 16. FIGS. 16(*a*) and (*b*) respectively show the frame image A and the frame image B selected by the user. This example assumes the image for which panning is done in the left and right direction for a mountain scene with the setting sun as the background. The relative positional relationship may be obtained as the translational vector in this kind of case assuming two images obtained by panning because there is no rotational displacement between the two images.

The translational vector can be expressed by both the horizontal direction and the vertical direction pixel count, and it is possible to generate this using known processing technology including image pattern matching and characteristic point tracking. If the relative positional data calculated from the translational vector generated in this way are horizontal direction pixel count Xb and vertical direction pixel count Yb, when the upper left corner of the screen of the frame image A has a reference point of (0, 0), the upper left corner of the screen of the frame image B has the coordinates (Xb, Yb). This status is shown in FIG. 16(*c*). In this way, the relative position of the frame image B in relation to the frame image A is calculated.

Also, when there is a difference in the rotation or image magnification between the frame image A and the frame image B, it is possible to calculate the relative position by combining the optical flow estimation and the pattern matching, for example. In the optical flow estimation, there are various methods, and for example with the gradient (gradient based) method, under the assumption that the brightness of the subjects is variable between the observed frame images, the movement of the object as the standard for the image capture device that uses the relationship between the space gradient and the time gradient of the concentration distribution of the subject in the image is estimated. Based on the results of this optical flow estimation, a rough estimate is made of the translational movement and of changes in the rotation and zoom magnification of the image, and also, the relative position is calculated by performing pattern matching between the frame image A and the frame image B based on the results of this estimation.

Figure 17:
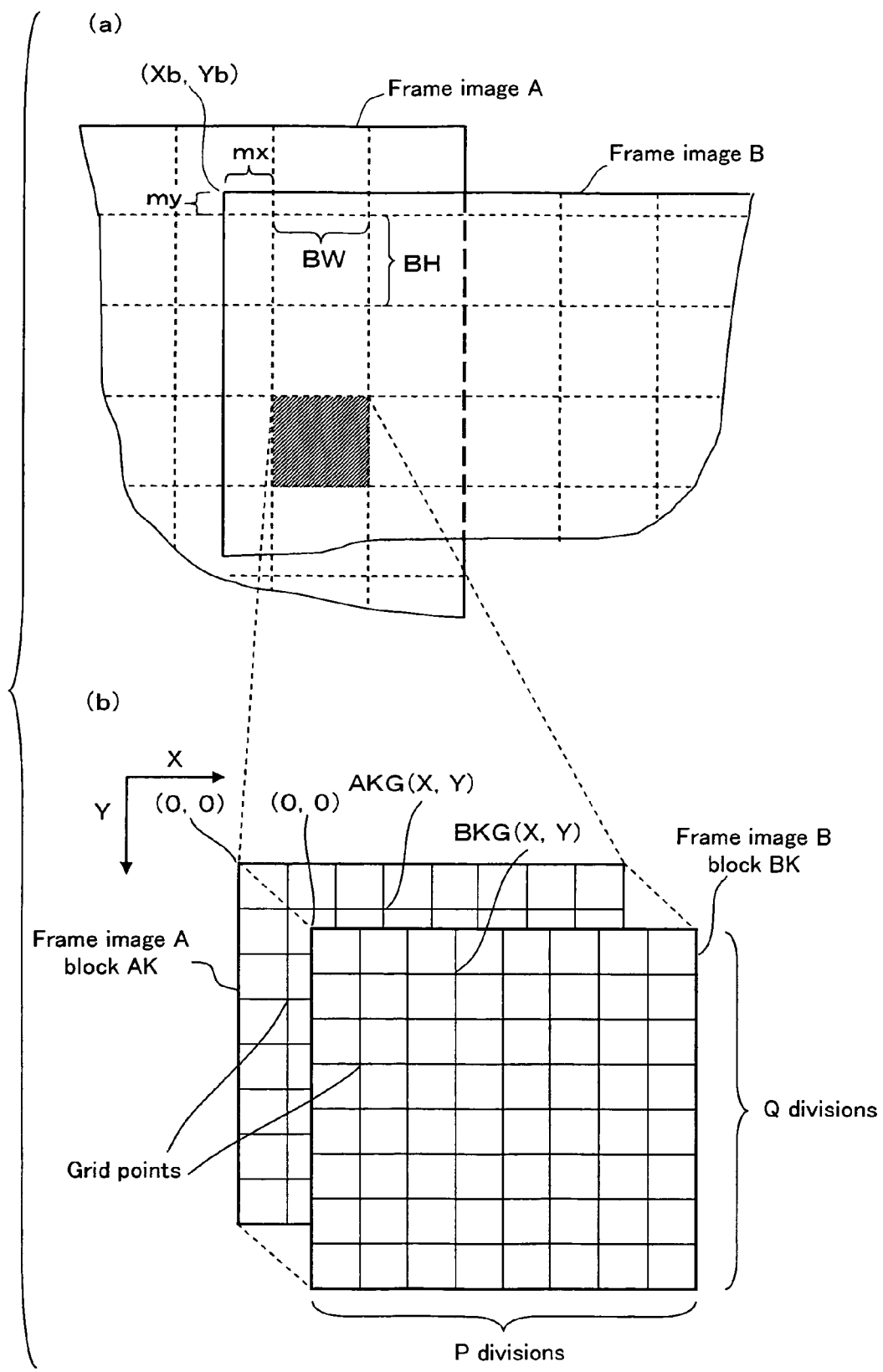
FIG. 17 is an explanatory drawing showing the block separation for images of the stitch part.

Next, in a state with the frame image A and the frame image B overlapped using the relative position, the overlapping part of the frame image A and the frame image B, in other words, the stitch part (the part inside the dotted line frame of FIG. 16(*c*)), is separated into blocks (step S220). An example of part of the state of the separation of the frame image A and the frame image B is shown in FIG. 17(*a*). For the separation, first, the frame image A is separated using a specified integer both vertically and horizontally (horizontal S, vertical T). For the division count, it is preferable to be in a range of from 8 divisions to 16 divisions both vertically and horizontally. The higher the division count is made, the smoother the image of the stitch part is, but the stitching process becomes slower, so it is preferable to determine this from the smoothness and the processing speed. It is also possible to have the user specify this from the start.

After that, the frame image B is separated into blocks by the division lines for which its stitch part overlaps the division lines of the frame image A. As shown in FIG. 17(*a*), the frame image B has the stitch part separated from the positions of the offset values mx and my. mx and my are determined according to the following equations (3) and (4) from the relative position (Xb, Yb) of the frame image B in relation to the frame image A, and the length of the separation interval (vertical BH and horizontal BW) determined by the division line of the frame image A.

$$mx = S \cdot BW - Xb \ (S: \text{integer}, 0 \leq mx < BW) \quad (3)$$

$$my = T \cdot BH - Yb \ (T: \text{integer}, 0 \leq my < BH) \quad (4)$$

As is clear from FIG. 17(*a*), with the offset values mx and my, for the frame image B, there are blocks for which the entire block overlaps the frame image A (in FIG. 17(*a*), one of these blocks is indicated by diagonal lines), and blocks in a state which do not overlap.

With this embodiment, the frame image A is considered as the standard, and the stitch part was separated by division lines that do integral separation of the frame image A, but it is also reasonable to use the frame image B as the standard and to separate the stitch part into blocks using the division lines for integral separation. In this case, the offset value is provided for the frame image A, and the frame image A is matched to the frame image B and separated.

Next, the following process is performed on each separated block for the stitch part of the frame image A and the frame image B. First, for the block being focused on, a determination is made of whether the entire item is overlapping (step S230). In the case of a block which is not entirely overlapping (step S230: No)), one block is used during the still image generation (step S260). With this embodiment, as described above, the block separation is done with the frame image A as the standard, so with blocks for which the entire item is not overlapping, it is necessary for the block of the frame image A to be used as one block. In the case of blocks when the entire item does overlap (step S230: Yes), the movement of the object for that block is calculated as the block movement volume using block matching (step S240).

Figure 18:
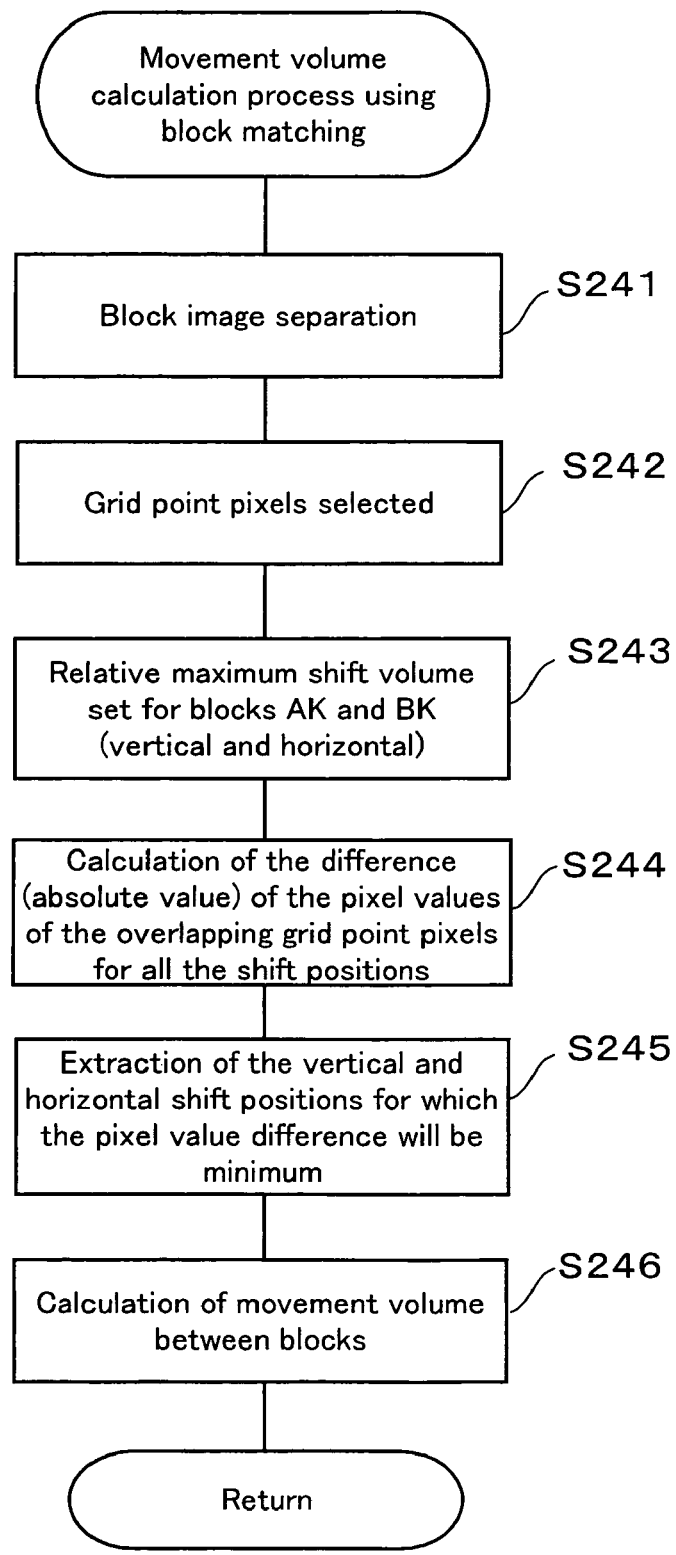
FIG. 18 is a flow chart for describing the process of calculating the block movement volume.

The process of calculating the block movement volume using block matching (step S240) will be described using the flow chart of FIG. 18. Block matching is a method whereby for blocks for which the entire item overlaps, the relative position between the blocks is shifted, and at each of the shifted positions, the pixel value difference between all of the overlapping pixels is calculated, and the relative position between the blocks when that value is smallest is obtained as the block movement volume.

When this process starts, first, to set the pixels used for block matching, the actual blocks being focused on are separated by integers both vertically and horizontally (horizontal P, vertical Q) (step S241). An example of this status is shown in FIG. 17(*b*). The example is shown correlated to the block for which the entire item overlaps (diagonal line part) shown in FIG. 17(*a*). With FIG. 17(*b*), the block AK of the frame image A and the block BK of the frame image B are illustrated separately for descriptive purposes, but they actually are overlapping. For the separation of the block AK and the block BK, it is preferable to separate equally in a range of 8 divisions to 16 divisions both vertically and horizontally.

If the division count is made higher, it is possible to do a detailed calculation of the block movement volume, so the precision of the determination of the object movement described later is improved, but the determination process becomes slower. Therefore, it is preferable to determine this from the precision and processing speed. It is also possible to have the user specify this from the beginning.

Here, both the block AK and the block BK have the crossing point of the division lines separated vertically and horizontally, in other words, the pixels that exist on the grid points (hereafter called "grid point pixels") are set as pixels for block matching (step S242). When there are no pixels on the grid points, it is also possible to decide by using a specified rule such as always having the pixel at the lower right of the grid point. FIG. 17(*b*) shows the status of being separated into eight equal divisions both vertically and horizontally, and the grid point pixels in this case result in a total of 81 points (pixels) including the block outer periphery part.

Next, the block AK and the block BK are shifted relative to each other, and to perform the process of obtaining the minimum value of the pixel value difference of all the grid point pixels that overlap (step S244 to S245), as preparation for this, first, the maximum relative shift volume, in other words, how many grid points maximum that are moved vertically and horizontally, is set (step S243).

The maximum shift volume is normally set as the volume for which the user can clearly recognize blurring and doubling for the still image generated by overlapping the block AK and the block BK at that volume. In specific terms, from the resolution, in other words, the screen size, of the frame image A or the frame image B, it is possible to determine how many grid points to use for the maximum shift volume. By doing this, with the movement areas that exceed the set maximum shift volume, it is clear that the overlapping images will be blurred or doubled, so it is not necessary to perform the pixel value difference calculation (described later) for the grid point pixels, and therefore the calculation load can be reduced.

With the maximum shift volume scope set in this way, the block AK and the block BK are shifted relative to each other one grid point at a time, and for all the shift positions, the pixel value difference (absolute value) of all the grid point pixels for which the block AK and the block BK are overlapped is calculated (step S244).

The pixel value of the grid point pixels of each block (hereafter called simply "grid point pixel value") is described using FIG. 17(*b*). As shown in the drawing, with the upper left corner of the screen of each block as the origin point (0, 0) when the screen horizontal right direction is +X and the screen vertical downward direction is +Y, the grid point pixel values of the block AK and the block BK are each represented as AKG (X, Y) and BKG (X, Y). Here, the grid point pixel values AKG and BKG are the brightness values of the pixels that the grid point pixels have. When the grid point pixels have the pixel data represented by R, G, and B, it is possible to convert them to brightness values using known calculation formulas. It is also acceptable to use all of RGB as the grid point pixel values from the start.

Figure 19:
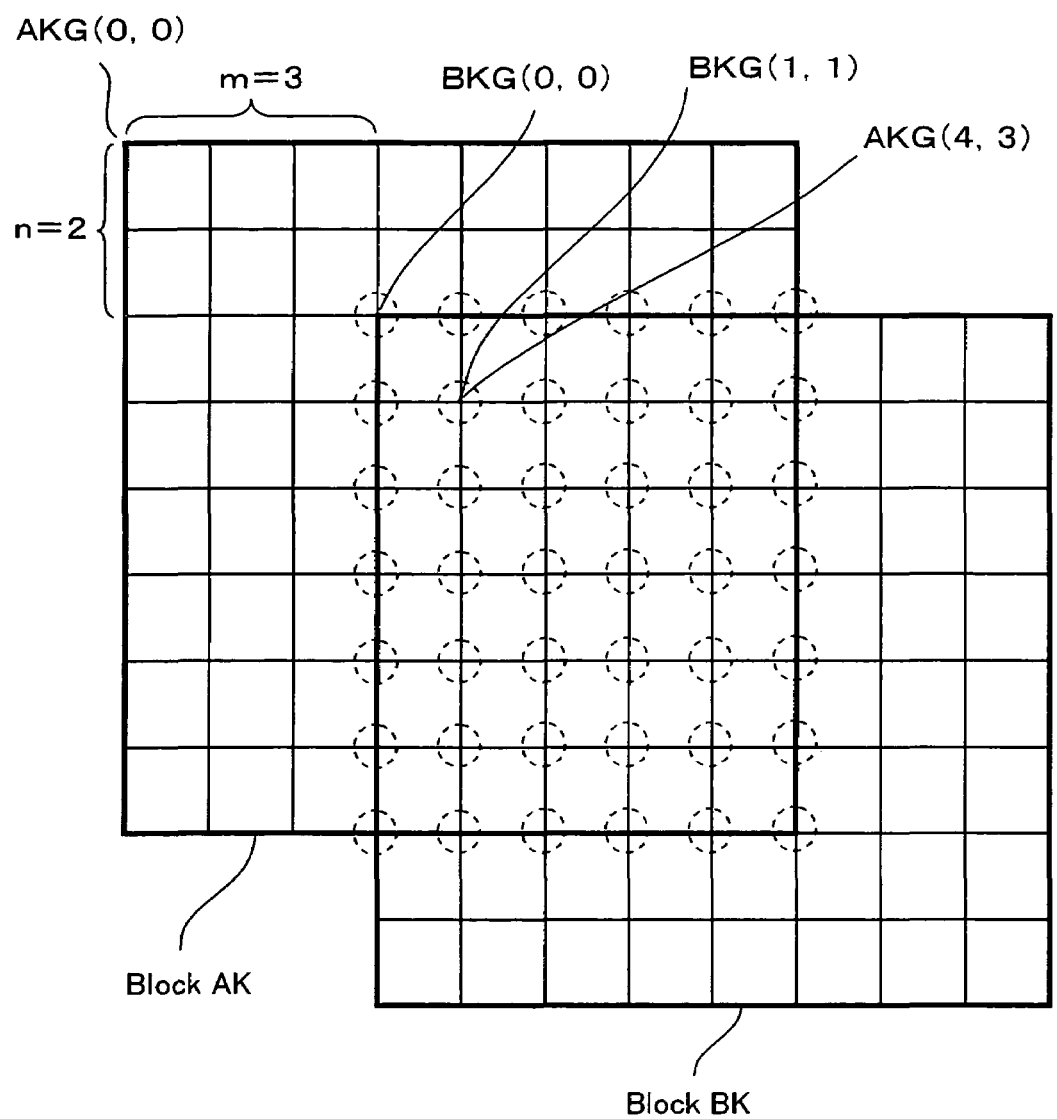
FIG. 19 is an explanatory drawing showing the grid point pixel values for performing difference calculation with the block movement determination process.

Next, with the block AK as the standard, when the block BK is shifted by m grid points in the screen horizontal (X) direction and by n grid points in the screen vertical (Y) direction, for the overlapping grid points, when the grid point pixel values of the block BK are represented as BKG (i, j), then the block AK grid point pixel values are AKG (i+m, j+n). FIG. 19 shows the state of the block BK moving in relation to the block AK by 3 grid (m=+3) in the screen rightward direction and by 2 grids (n=+2) in the screen downward direction, and for example for the position i=1, j=1, shows an example of the grid point pixel of the block AK having the grid point pixel value AKG (4, 3) overlapping with the grid point pixel of the block BK having the grid point pixel value BKG (1, 1).

When the shifted position is m grid points toward the screen horizontal (X) and n grid points toward the screen vertical (Y), the difference DIF of all the overlapping grid point pixel values is found using the following equation (5).

$$\text{DIF}(m, n) = \Sigma |\text{AKG}(i+m, j+n) - \text{BKG}(i, j)| \quad (5)$$

Here, the value of i is changed in the range for which an integer value satisfies $0 < i < P-m$ (when $0 < m$) and $-m \leq i \leq P$ (when $m < 0$), and the value of j is changed in the range for which an integer value satisfies $0 \leq j \leq Q-n$ (when $0 \leq n$) and $-n \leq j \leq Q$ (when $n < 0$). P and Q are respectively the horizontal division line and the vertical division line of the block AK (the block BK). Then, the grid point pixel value difference for all the values for which i and j had changed was calculated for the absolute value and totaled to calculate the DIF (m, n). With the example in FIG. 19, the grid point pixel values of the 42 grid point pixels for which the block AK and the block BK overlap shown by the dotted line circle corresponds to the calculation subject of the DIF (m, n). The result of this calculation is the grid point pixel value difference DIF for the shift position (m, n).

Next, the calculation of the equation (5) is performed in the range of all the maximum shift volumes set at the previous process step S243 (FIG. 18) while shifting the grid points one at a time. For example, when the maximum shift volume is set to 4 grid points left and right and 3 grid points up and down, the integer value within the range of m±4 and n±3 is changed one at a time, and the calculation of equation (5) is performed for each. The DIF is calculated for all the numerical values for which m and n are fetched, and the process step S244 ends.

From the calculation results of the process step S244, the vertical and horizontal shift position for which the pixel value difference DIF is the smallest is extracted (step S245). After that, from the extracted vertical and horizontal shift positions, in other words from the number of shifted grid points, the movement volume between the block AK and the block BK is calculated (step S246). With ms as the absolute value of the horizontal grid point movement count when the pixel value difference DIF is the smallest, ns as the absolute value of the vertical grid point movement count, P as the block AK (the block BK) division line horizontal, Q as the vertical, BW as the block AK (the block BK) horizontal length (pixel count), and BH as the vertical length (pixel count), the movement volume BV is found from the following equation (6).

$$BV = \{(ms \times BW/P)^2 + (ns \times BH/Q)^2\}^{1/2} \quad (6)$$

The results calculated using equation (6) are the movement volume between blocks BV.

Figure 20:
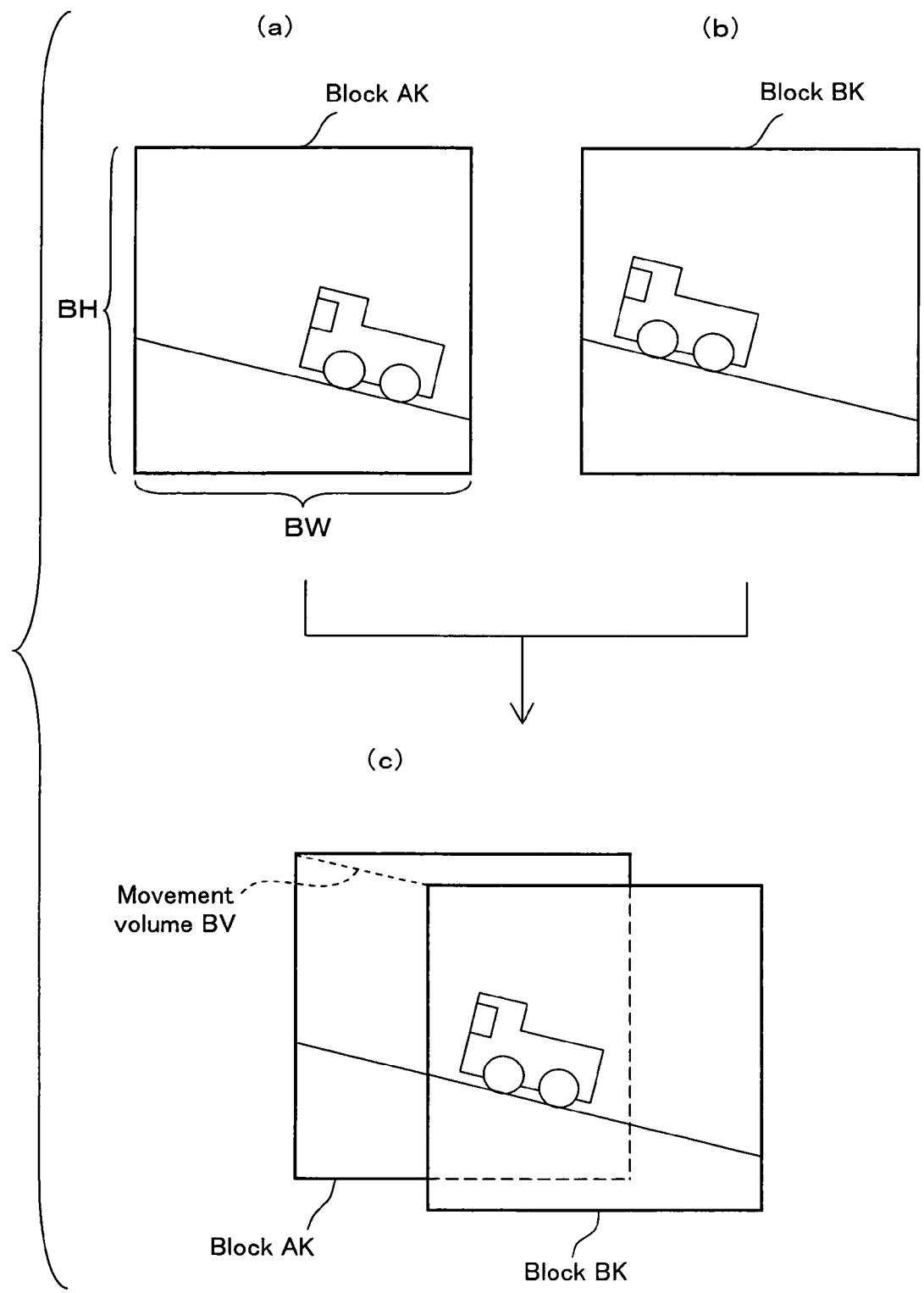
FIG. 20 is an explanatory drawing showing the calculation of the block movement volume.

FIG. 20 shows an example of the movement volume BV calculated by block matching. FIG. 20 is a pattern drawing depicted assuming that a vehicle is running from right to left on the diagonal surface of the screen. FIG. 20(a) shows the image of the block AK, and FIG. 20 shows the image of the block BK, and these show the state of a vehicle having moved. With the example in FIG. 20, when block matching is performed with the block AK and the block BK, when it is assumed that the block image is a simple line drawing that does not consider the background, the pixel value difference DIF is in its smallest state when the vehicle overlaps. This is shown in FIG. 20(c). The movement volume BV of the block AK and the block BK in this state is obtained using equation (6). The calculation described above is performed, the process for calculating the movement volume of blocks using the block matching ends, and the process returns to the next process step S250 (FIG. 15).

At process step S250, the movement volume BV is compared with a determination value prepared in advance, and a movement determination is performed for the block AK and the block BK. The determination value in this case is preferably the movement volume (pixel count) for which the image does not blur or become doubled when the blocks overlap. In specific terms, the determination value can be decided as how many grid points (or how many pixels) from frame image A or the frame image B resolution, in other words, the pixel count in relation to the screen size. When the movement volume BV is larger than the determination value, the object between the block AK and the block BK is determined to have "moved." Also, as described previously, with the process step S243, the range for which the image clearly is blurry or becomes doubled is set as the maximum shift volume, so when there is no DIF minimum value within the maximum shift volume range, in other words when the DIF is the minimum value at the position of the set maximum shift volume, the object is similarly determined to have "moved."

After the process of determining movement of the object of the block is performed in this way using the process step S250, when the object has moved (step S250: Yes), one block is used (step S260), and when the block has not moved (step S250: No), two blocks are used (step S270), and a still image is generated for each block (step S280).

With this embodiment, when using one block, as described above, with blocks for which the entire item is not overlapping, the frame image A block AK is used. Therefore, for moved blocks as well, it is preferable to use the block AK of the frame image having consecutive images. When doing block separation with the frame image B as the standard from the beginning, it is preferable to use the frame image B block BK. Alternatively, it is also possible to use the adjacent block of the same frame image for blocks for which the one used block is positioned at the end part of the stitch part. By doing this, when the object moved to the end part of the stitch part has moved, it is possible to reduce the distortion of the moved object because consecutive frame images are used.

In this way, a determination is made of whether or not processing has ended for all the separated blocks for the stitch part of the frame image A and the frame image B (step S290), and when not ended (step S290: No), the movement determination of the block object is repeated, the frame image used for each block is detected, the still image is generated, and all the processes end (step S290: Yes).

Figure 21:
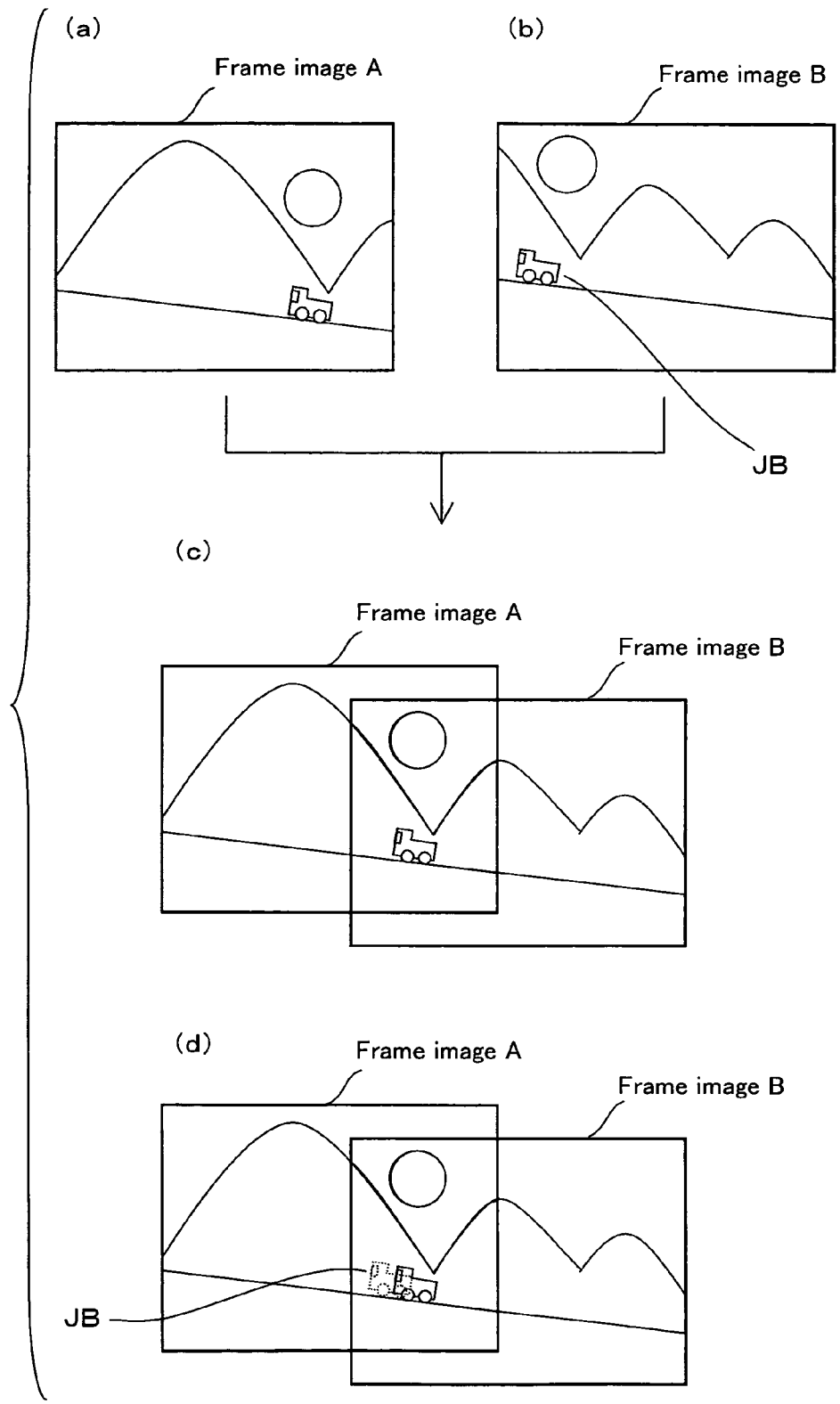
FIG. 21 is an explanatory drawing showing the still image generated with this embodiment.

An example of a still image generated and processed in this way is shown in FIG. 21. FIG. 21(a) shows the frame image A and FIG. 21(b) shows the frame image B. Shown in the image of FIG. 21 is a vehicle moving from right to left on the slanted surface of the screen such as the example shown in FIG. 20. In this case, the generated still image is shown as an example in FIG. 21(c). When the still image is generated, with the block that shows the vehicle, only the frame image A is used for determining the block for which the object moved, and the frame image B is not used. Therefore, the vehicle JB of the frame image B (FIG. 21(d): dotted line) is not shown, and the generated still images are not blurred and are not doubled.

As described above, with the processing method of this embodiment, the stitch part is separated into blocks, and one image is used for the blocks for which it is determined that the object has moved, and for blocks for which it is determined that the object did not move, the images are generated using a plurality of frame images, so it is possible to generate a still image for which there is no blurring or doubling, and for which there is little image distortion. Note that when there are two or more plurality of frame images in the stitch part, focus is placed on two of the plurality of frame images, the process method of this embodiment is performed, and after that, one at a time is selected from the remaining frame images, and the same process may be repeated.

Above, aspects of implementing the present invention were described using an embodiment, but the present invention is not limited in any way to this kind of aspect implementation, and it is of course possible to implement various aspects within a scope that does not stray from the key points of the present invention. For example, at the process step S280 (FIG. 15) with this embodiment, a mark is made fore each block once for the frame images used for generating the still image, and after determination of movement of the object for all the blocks has ended, it is possible to connect and consolidate the stitch part using the marked frame images, and then to generate the still images. By doing this, it is possible to perform the still image generation process in batch form, and to reduce the processing load. It is also possible to not use grid point pixels as the pixels used for the block matching, and to calculate the block movement volume using all the pixels. By doing this, the pixel value difference calculation process load does increase, but it is possible to calculate the block movement volume with one pixel units.

Also, with this embodiment, when doing block separation of the stitch part of the frame image A and the frame image B, integral separation was performed on one of the frame image A or the frame image B. Therefore, as described above, there are blocks for which the overall item overlaps and blocks for which the overall item does not overlap in the stitch part, but as a variation example, it is also possible to do integral separation so that all the stitch part is blocks for which the entire item overlaps. Note that with this embodiment, the frame images extracted from the moving image were used as the plurality of images that are subject to overlapping, but if the image is of a level for which it is possible to determine the relative positional relationship, any kind of image may be handled as the subject image. For example, it is possible to use a plurality of images aligned in time series sequence such as time lapse photography, or a plurality of still images imaged using a digital still camera or the like.

Figure 22:
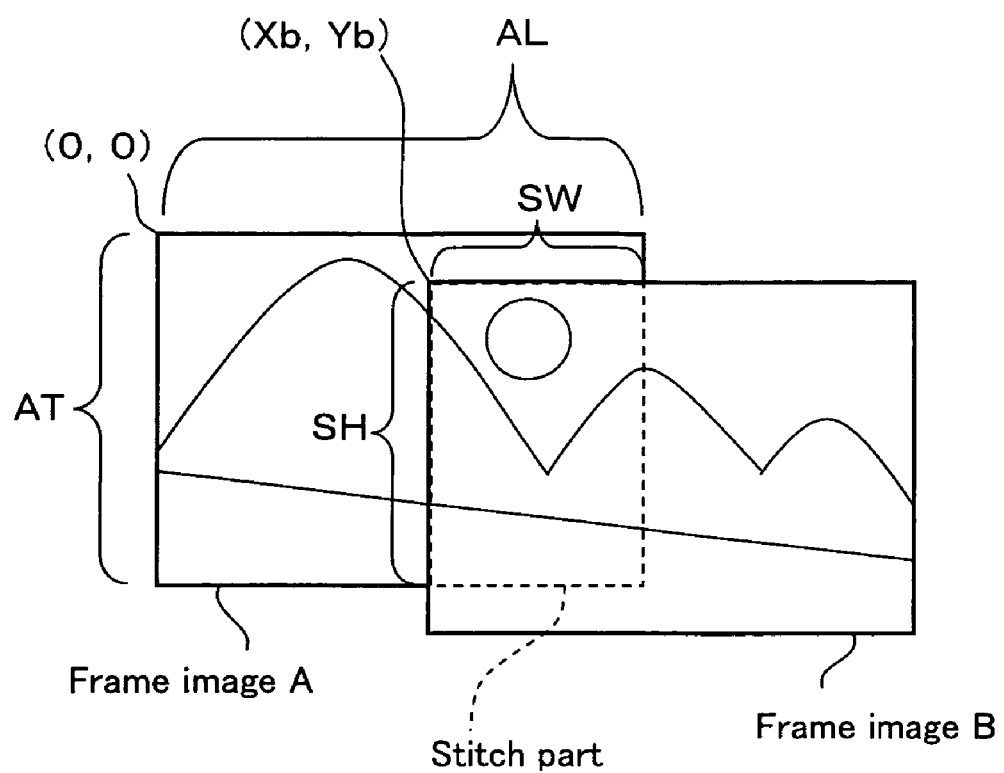
FIG. 22 is an explanatory drawing showing the stitch part separation with a variation example of this embodiment.

(F) Stitching Process Variation Example:

A variation example of this embodiment is described using FIG. 22. When the upper left corner of the frame image A is the origin point (0, 0) and the upper left corner of the frame image B is (Xb, Yb), if the horizontal length is AL of the screen of the frame image A (frame image B) and the vertical length is AT, then the stitch part horizontal length SW and the vertical length SH are obtained using the following equations (7) and (8).

$$SW = AL - Xb \quad (7)$$

$$SH = AT - Yb \quad (8)$$

The calculated values SW and SH according to the equations (7) and (8) are integrally separated. When separating, the division count is decided so that the separation interval (pixel count) when separating is equal or near in value to the interval of the block division of the frame image A described with this embodiment. The same as with this embodiment, this is because though the image of the stitch part becomes smoother if the block division count is made higher, the stitch processing becomes slower.

As is clear from FIG. 22, with this variation example, the process for calculating the division count increases, but the stitch part can be divided into blocks for which all have the entire item overlapping. As a result, it is possible to perform movement determination of the objects using all the blocks of the stitch part. When generating still images as well, it is possible to use the frame image A blocks and the frame image B blocks for blocks with no movement for the entire stitch part.

Above, embodiments of the present invention were described, but the present invention is not limited to this kind of embodiment, and of course it is possible to implement various aspects in a range that does not change the key points of the present invention. The protected scope of the invention is set as the scope of the statements and their equivalents recited in the claims.

What is claimed is:

1. An image processing device for stitching a plurality of subject images and generating a rectangular still image from the stitched images, the image processing device comprising:

an image acquisition unit that acquires the plurality of subject images;

a positional relationship data generating unit that generates positional relationship data representing a relative positional relationship by which the acquired plurality of subject images are stitched;

an image area recognition unit that arranges the plurality of subject images according to the positional relationship data, and that recognizes an image existence area defined by a logical sum of the arranged plurality of subject images;

a rectangular image area determination unit that determines a rectangular image area to be generated from the recognized image existence area; and a still image extraction unit that extracts the rectangular still image using the plurality of subject images that exist in the determined rectangular image area, the still image extraction unit including an image identification unit that identifies a plurality of subject images existing in the determined rectangular image area;

a block separation unit that separates into one or more blocks that segment a same area for each overlapped subject image an overlapping part of the image for the identified plurality of subject images, the block separation unit including a first separation unit that separates vertically and horizontally one of the overlapped plurality of subject images, and acquires a plurality of blocks having the size M pixels X N pixels (M and N are integers of 2 or greater), and a second separation unit that acquires blocks for segmenting the same area by matching the subject images other than the one subject image of the plurality of subject image to the position of the block of the one subject image and performing separation;

a movement determination unit that determines, for each of the blocks, movement of a object existing in the block; and a still image generating unit that generates the still image using one of the subject images of the plurality of overlapped subject images for the blocks judged for which it is decided that the object has moved a specified amount or more by the movement determination unit, and using the overlapped plurality of subject images for the other blocks, wherein the still image generating unit does not use for generation of the still images a surplus block of a size less than M pixels X N pixels that is generated for the subject image separated by the second separation unit, wherein each of the units in the image processing device is executed by an integrated circuit.

2. The image processing device in accordance with claim 1 wherein the image area recognition unit recognizes the image existence area by an existence position information of pixels that are included each of the plurality of subject images; and the rectangular image area determination unit determines the rectangular image area using the existence position information of the pixels.

3. The image processing device in accordance with claim 1 or 2, wherein the image acquisition unit that acquires a standard subject image specified as the acquisition standard from a moving image including a plurality of the frame images, and at least one of the frame images existing before or after the standard subject image.

4. The image processing device in accordance with claim 3 wherein the plurality of subject images are the frame images acquired at specified intervals from the moving image, including the standard subject image.

5. The image processing device in accordance with claim 1, wherein the image acquisition unit that acquires as the subject image an image for which the perimeter of the original image to be acquired is cut off at a specified ratio, when acquiring the plurality of subject images.

6. The image processing device in accordance with claim 1, wherein the rectangular image area determination unit comprises:
   unit that receives a nomination for at least one of the plurality of subject images; and
   unit that determines a largest area among the rectangular image area including the specified subject image from the recognized image existence area.

7. The image processing device in accordance with claim 1, wherein the rectangular image area determination unit comprises:
   unit that receives specification of an aspect ratio of the rectangular image area to be determined; and
   unit that determines a largest area of the rectangular image area having that aspect ratio from the recognized image existence area.

8. The image processing device in accordance with claim 1, wherein
   the movement determination unit determines movement of the object using the pixel value that specified pixels within the block have.

* * * * *